(12) United States Patent
Crites et al.

(10) Patent No.: US 9,866,391 B1
(45) Date of Patent: Jan. 9, 2018

(54) PERMISSIONS BASED COMMUNICATION

(71) Applicant: Amazon Technologies, Inc., Reno, NV (US)

(72) Inventors: Justin Canfield Crites, Seattle, WA (US); Jesper Mikael Johansson, Redmond, WA (US); Daniel Bruce Lloyd, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 63 days.

(21) Appl. No.: 13/754,756

(22) Filed: Jan. 30, 2013

(51) Int. Cl.
*H04L 9/32* (2006.01)

(52) U.S. Cl.
CPC .................. *H04L 9/3244* (2013.01)

(58) Field of Classification Search
CPC .......................... H04L 9/3281; H04L 63/0428
USPC ............................................. 726/2; 713/170
See application file for complete search history.

(56) References Cited

U.S. PATENT DOCUMENTS

| | | | | |
|---|---|---|---|---|
| 7,185,192 B1* | 2/2007 | Kahn | ............................. | 713/155 |
| 8,560,655 B2* | 10/2013 | Logan et al. | ................. | 709/223 |
| 2006/0190734 A1* | 8/2006 | Spitz | ............................. | 713/176 |
| 2009/0198997 A1* | 8/2009 | Yeap et al. | ..................... | 713/155 |
| 2013/0091358 A1* | 4/2013 | Lund et al. | .................... | 713/169 |
| 2014/0075185 A1* | 3/2014 | Dragomir et al. | ............. | 713/156 |

* cited by examiner

*Primary Examiner* — Anthony Brown
(74) *Attorney, Agent, or Firm* — Thorpe North & Western, LLP.

(57) ABSTRACT

A method for permissions based communication in an example includes receiving an electronic communication from a sender to a recipient at a domain server. The electronic communication may include a permission request for permission to send subsequent electronic communications to the recipient. The electronic communication may be analyzed at the domain server to determine whether to deliver the subsequent electronic communications from the sender to the recipient.

26 Claims, 16 Drawing Sheets

PERMISSIONS BASED COMMUNICATION

BACKGROUND

Electronic mail or "email" is an example method of exchanging digital communications between an author of the email and one or more recipients. Electronic communications are commonly transmitted over a network, such as a local network, the Internet and so forth. Electronic communication systems may enable users to perform actions related to the communication, such as creating, receiving, storing, forwarding and so forth. Email communications, for example, are commonly processed as follows. A user may compose a message using a mail user agent, including a recipient email address, which may be sent to an Internet service provider or other mail submission agent, which resolves the recipient email address to determine where to send the email. The email may be sent to one or more message transfer agents before reaching a message delivery agent. The recipient may then receive the email in an email mailbox. While this description represents one example email process, there are various alternative configurations and complexities which may also be utilized.

Many mail transfer agents have been exploited in the past to send unsolicited bulk email, commonly referred to as "spam". Spamming, phishing, email bombardment, email spoofing and email worms are common issues that are faced by email providers and email users. Because the cost of sending email is small, spammers and other nefarious individuals may send hundreds of millions of email messages each day over an inexpensive Internet connection. This volume of email may be overwhelming for email servers and/or for email users. These emails may also contain malware programs causing a constant flow of unwanted email or causing more serious issues. Further, many malicious emails may pose a threat to an individual's privacy. Combating threats posed by spamming, malware and so forth to ensure a user's privacy and to reduce or eliminate unwanted email items in the user's email mailbox has been a focus of many efforts for a number of years.

DETAILED DESCRIPTION

A technology is provided for permissions based communications between message senders and domains, as well as between senders and message recipients. In an example of the present technology, a method for permissions based communication includes receiving an electronic communication from a sender to a recipient at a domain server. The electronic communication may include a permission request for permission to send subsequent electronic communications, such as email, to the recipient. The electronic communication may be analyzed at the domain server on behalf of the recipient to determine whether to deliver the subsequent electronic communications from the sender to the recipient. Permission may be granted or denied to the sender by the domain server to send the subsequent electronic communications, such as based upon rules set by the domain or the recipient.

The technology may include asymmetric public key encryption of a communication from a sender and again an acknowledgment from a recipient. For example, a permissions based communication system or method may send a request to a recipient for permission to send future electronic communications, where the request is signed with a sender private key from a sender asymmetric key pair. A sender public key may be exposed for the recipient to validate the sender private key. The recipient may supply permission to send future electronic communications, and the permission may be signed with a recipient private key of a recipient asymmetric key pair. The sender may validate the permission signed with the recipient private key using an exposed recipient public key and store the permission as a permission confirmation.

The present technology may provide a cryptographic method for tracking, in a way verifiable by a third-party, whether any recipient opted-in to receive communication from a sender. Email services may be used to send email on behalf of a sender. However, a sender may possess a list of email addresses to which the sender may wish the email service to send communications, but the list may be old, may have been purchased illegitimately, may contain spam traps or may be subject to any of a number of other issues. The present technology may enable the email service to evaluate the legitimacy of such a list. Furthermore, the present technology may enable senders to verify and track which recipients have approved receipt of communications, and/or may enable domains to approve or reject receipt of communications from the sender on a domain level rather than an individual level.

Figure 1:
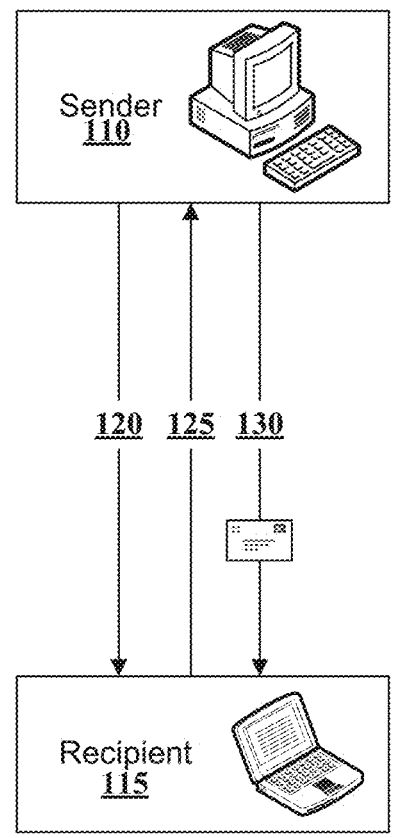
FIG. 1 is an illustration of a permission request sent between a sender and a recipient in accordance with an example of the present technology.

Referring to FIG. 1, a permissions based communication between a sender 110 and a recipient 115 is illustrated in accordance with an example. In this example, three exchanges 120, 125, 130 are illustrated between the sender and the recipient. This example represents an implementation of the technology operable directly between a sender 110 and recipient 115 without an intervening domain system, email service or other device, service or entity for which examples will be described in further detail later. When a sender 110 desires to send a communication, the sender 110 may begin by determining available email addresses for potential recipients of the communication. If the sender 110 does not already have explicit permission from one or more of the recipients, then the sender 110 may send a request 120 to the recipient 115 for permission to send communications. The recipient 115 may confirm or deny the request by clicking on a link, replying to the email request, taking no action etc. If the recipient 115 grants permission 125 or approval to the sender 110 to send future communications, the sender 110 may then optionally store the permission, and the sender 110 may send the additional communication(s) 130. If at some point, the recipient 115 wishes to cease receiving communication from the sender 110, the recipient 115 may unsubscribe from receiving future communications by clicking a link, sending an unsubscribe email and so forth.

Many email publishers and marketers include a list-unsubscribe header as an optional chunk of text in the header portion of the communications to be sent to recipients. The header may not generally be visible to the recipients, but the recipients may be provided with an unsubscribe button or other unsubscribe option for automatically stopping receipt of future communications from the email sender (e.g., the publisher/marketer). An example list-unsubscribe header is as follows:

List-Unsubscribe: <mailto:unsubscribe-espc-tech-12345N@domain.com>, <http://domain.com/member/unsubscribe/?listname=espc-tech@domain.com?id=12345N>

Such a list-unsubscribe header may support both email based (mailto) and web based (http (Hypertext Transfer Protocol)) unsubscribe mechanisms.

The list-unsubscribe protocol may be extended to enable the recipient to opt out of particular types of messages or to opt out of messages from a particular domain or to opt out of messages sent by a sender from one or more domains associated with the sender. The email header used to implement the list-unsubscribe protocol may similarly trigger an unsubscribe option to be displayed as with a conventional unsubscribe option, but may provide further granularity in unsubscribing. For example, if the recipient selects to unsubscribe upon receipt of an announcement message, a system at a mail domain server may ask the recipient whether to unsubscribe from the announcement messages without unsubscribing from other communications, such as order confirmations. Definition of what to allow or disallow (i.e., unsubscribe from) may provide a mechanism for creating and transmitting a new permission grant to the sender consistent with the definition of what is permitted.

The recipient 115 of the email may be provided with other options for manually or automatically filtering, replying to, unsubscribing from and otherwise performing a desired action on a communication from the sender 110, including the requests for permission to send further communications. For example, the recipient 115 may wish to automatically respond to communications and permission requests based on one or more rules, which may be definable by the recipient 115. For example, the recipient 115 may define a rule which approves requests from senders in which the sender demonstrates knowledge of who the recipient 115 associated with the email address is, such as by inclusion of the recipient's full name in a permission request. As another example, the recipient 115 may define a rule which approves or permits requests or communications of a particular type (such as marketing, sales, news and so forth). Rules and implementation of rules will be described in further detail later with regard to other examples of the technology.

While this and other examples of the technology are primarily described in terms of email communications, including communications to or from email addresses, the technology may also be applied in the context of any other electronic communication. For example, instant messaging, texting, Voice over Internet Protocol (VoIP) communications, file sharing, video conferencing, networked collaboration and other technologies may also utilize the technology described herein.

Figure 2:
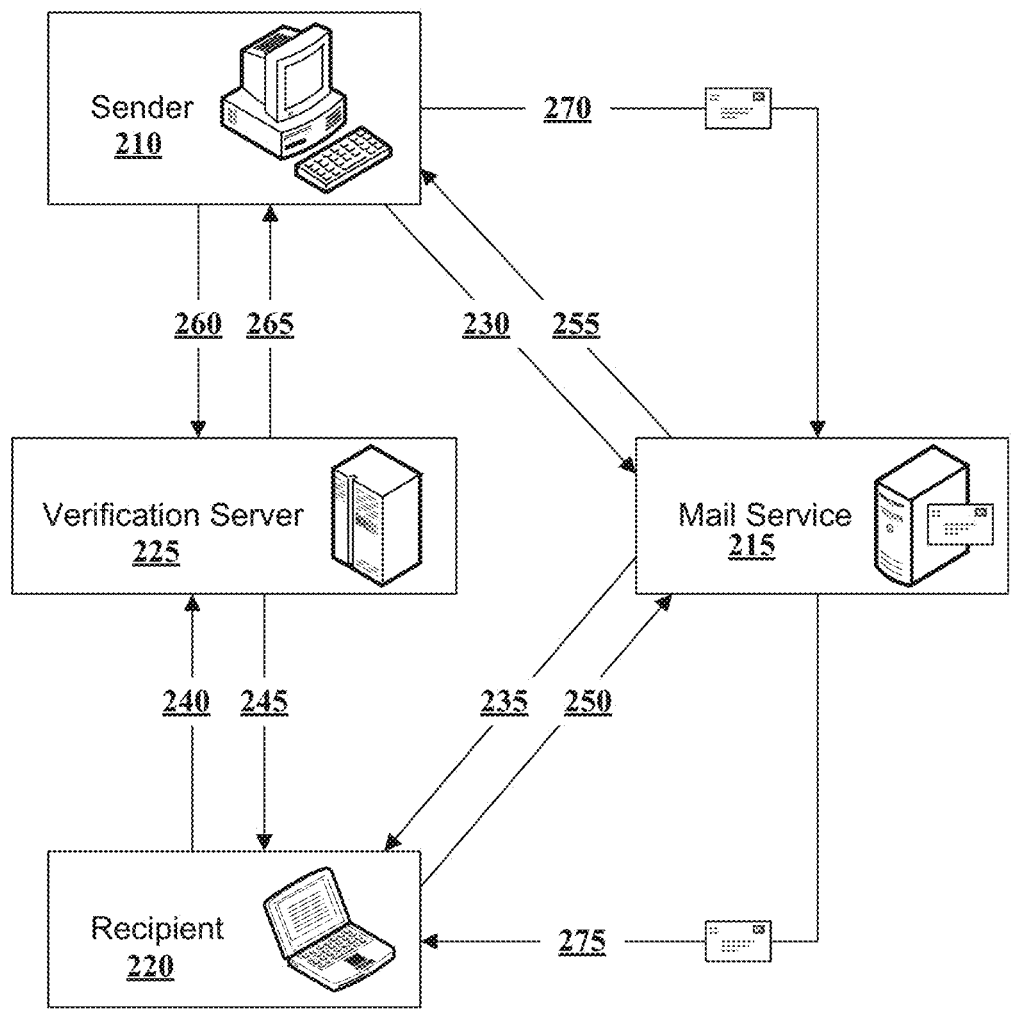
FIG. 2 is an illustration of a permission request sent between a sender, a mail service and a recipient in accordance with an example of the present technology.

Referring to FIG. 2, an example of the present technology is illustrated which includes verification of credentials in implementing permissions based communications between a sender 210 and a recipient 220 via a mail service 215. This and other examples of the present technology may describe verifications and/or credentials in terms of encryption, and other types of non-encrypted credentials or verifications may also be used. Encryption is an example technology which may increase security and assurances that the verifiable identity of the recipient 220 or sender 210 corresponds with a purported identity of the recipient 220 or sender 210.

Encryption of electronic communication contents, such as email content, has been used in the past for encryption of email message contents to protect the content from being read by unintended recipients. Permissions based communication systems according to the present technology may work alongside or independently of existing encryption technologies for protecting the content of electronic communications.

Encryption may utilize public-key cryptography, in which users may publish a public key that may be used by others to encrypt or decrypt electronic communication contents. Similarly, by keeping a secret private key corresponding to a public key, users may decrypt electronic communications encrypted with the public key. Users may also digitally encrypt and sign electronic communications using the public key.

In FIG. 2, communications between the sender 210 and recipient 220 may be verified using a verification server 225. The verification server 225 may host a public key for inspection by a receiver of a message signed with a private key. In the example illustrated, both the sender 210 and the recipient 220 may be receivers of messages signed with private keys at different times in a process. This specific example will be described in terms of the encryption or cryptographic keys being asymmetric. However symmetric keys may be used as well as other tokens or forms of security.

A request 230 may be sent to a recipient 220 for permission to send future electronic communications. The request 230 may be sent via a mail service 215, as illustrated, or may be sent directly to the recipient 220, similar to the illustration in FIG. 1. The request 230 may be signed with a sender private key from a sender asymmetric key pair. The sender 210 may generate the sender asymmetric key pair or may use a key generation service to generate the sender asymmetric key pair. For example, the verification server 225, which may host and publicly expose a sender public key of the sender asymmetric key pair as will be described, may also provide a key generation service for generating, storing and otherwise managing encryption keys. The sender 210 may use this key generation service to generate the sender asymmetric key pair.

A sender public key may be exposed for the recipient 220 to validate the sender private key. For example, the sender's public key may be published publicly in a well-known location from which the recipient may retrieve the sender public key, such as the sender's DNS (Domain Name System). Optionally, the recipient 220 may evaluate the permission request by examining the sender's domain name against a public registry of known good or bad sending domains.

The recipient 220 may receive the permission request 235 and may validate or verify the permission request. For example, the recipient 220 may confirm that the permission request signature (i.e., the sender private key) matches or corresponds with the domain name's public key (i.e., the sender public key). Validating the signature cryptographically may confirm that the sender is authorized by the domain associated with the sender 210. Such a verification process may assist in avoiding or reducing email spoofing, in which the sender address and other parts of the email header may be altered to appear as though the email originated from a different source than the actual source. In one example, the recipient may validate the permission request using the verification server 225. The verification server 225 may be a server for the sender's domain or may be a different server on which the sender public key is exposed. The verification process may involve transmitting a request 240 for the sender public key and receiving 245 the sender public key. In another example, the verification or validation process may involve transmitting the permission request signed with the sender private key and receiving a confirmation that the sender public key matches the sender private key.

Once a permission request has been received and validated, the recipient 220 may supply a permission response 250, 255 to the sender 210 to send future electronic communications to the recipient. For example, the recipient 220 may supply the permission response in the form of a return electronic communication such as email, which may be sent directly to the sender 210 or via the mail service 215 to the sender 210. By sending the permission response 250, 255 via the mail service 215, the system may avoid confirming to the sender 210 that the recipient email address is valid if the recipient 220 denies permission to send future communications. For example, the mail service 215 may forward permission grants to the sender 210, but may send a no-permission-granted communication to the sender 210 when either the recipient 220 email address is invalid or when the recipient has denied permission. The mail service 215 may also forward denials of permission to the sender 210 and may optionally act to prevent communications from the sender 210 to the recipient 220, but if a sender 210 is simply attempting to verify whether an email address is valid then sending a no-permission-granted communication to the sender 210 may avoid confirmation that the email address is valid while in effect denying the grant of permission. Even if the mail service 215 blocks future communications from the sender 210 to the recipient 220 based on the permission denied message in the example where the no-permission-granted communication is sent to the sender 210, the sender 210 may easily circumvent protection mechanisms by sending future communications to the recipient 220 directly or via a different mail service once the email address is confirmed as valid. Lack of determination that an email address is valid may deter such circumvention schemes by some senders 210. However, other protection mechanisms may also be implemented to avoid such circumvention, such as have been described previously with regard to FIG. 1 and which will be described later with respect to other of the drawings and examples of the technology.

In an instance where the permission response from the recipient 220 to the sender 210 includes a permission grant, the sender 210 may begin sending communications to the recipient 220 in accordance with the scope of permission granted. A type or scope of permissions which may be granted will be described in additional detail later.

Optionally, the permission response from the recipient 220 may be signed with a recipient private key of a recipient asymmetric key pair. The permission response signed with the recipient key may be used in a number of ways or for a number of reasons. For example, the sender 210 may store the permission response signed with the recipient private key as a record of the confirmation by the recipient 220 that the sender 210 has permission to send communications. The response signed with the private key may be supplied to a recipient 220, mail service 215 or other entity, if a question is raised as to whether the sender 210 is authorized to send the communication to the recipient 220. Also, the sender 210 may validate 260 the permission signed with the recipient private key against an exposed recipient public key to verify 265 that the recipient is who the recipient purports to be and to verify that the recipient 220 has rights, privileges or authority sufficient to provide the permission to receive future communications. The sender 210 may thus avoid being spoofed by the recipient 220 and may avoid committing resources to sending the future communications when the permission is not valid for one reason or another.

Where the permission response 250, 255 includes a permission grant and the permission signed with the recipient private key is validated against the recipient public key, the sender 210 may proceed with some confidence to send communications 270, 275 to the recipient, knowing that the communications have been approved and are likely being delivered to and potentially read by the recipient 220.

The mail service 215 in this example operates between the sender 210 and receiver 220 and may optionally be substantially uninvolved in the permissions process between the sender 210 and the receiver 220 other than as a conduit facilitating the communication of the permissions. However, as will be described in other examples later, the mail service 215 may have varying levels of involvement, such as granting or denying permissions to the sender 210 on behalf of the receiver 220, depending on the configuration of the technology implemented.

While the term "sender" is primarily used herein to describe a device associated with an entity desiring to send a communication, a "sender" may also refer to the entity, person or organization associated with the sender device 210 as well as a mail service 215 utilized or accessed by the device or entity in sending the communication to the recipient. Similarly, a recipient may refer to an end-user to which the communication is directed, or may also include or refer to a domain, an email service and so forth.

Figure 3:
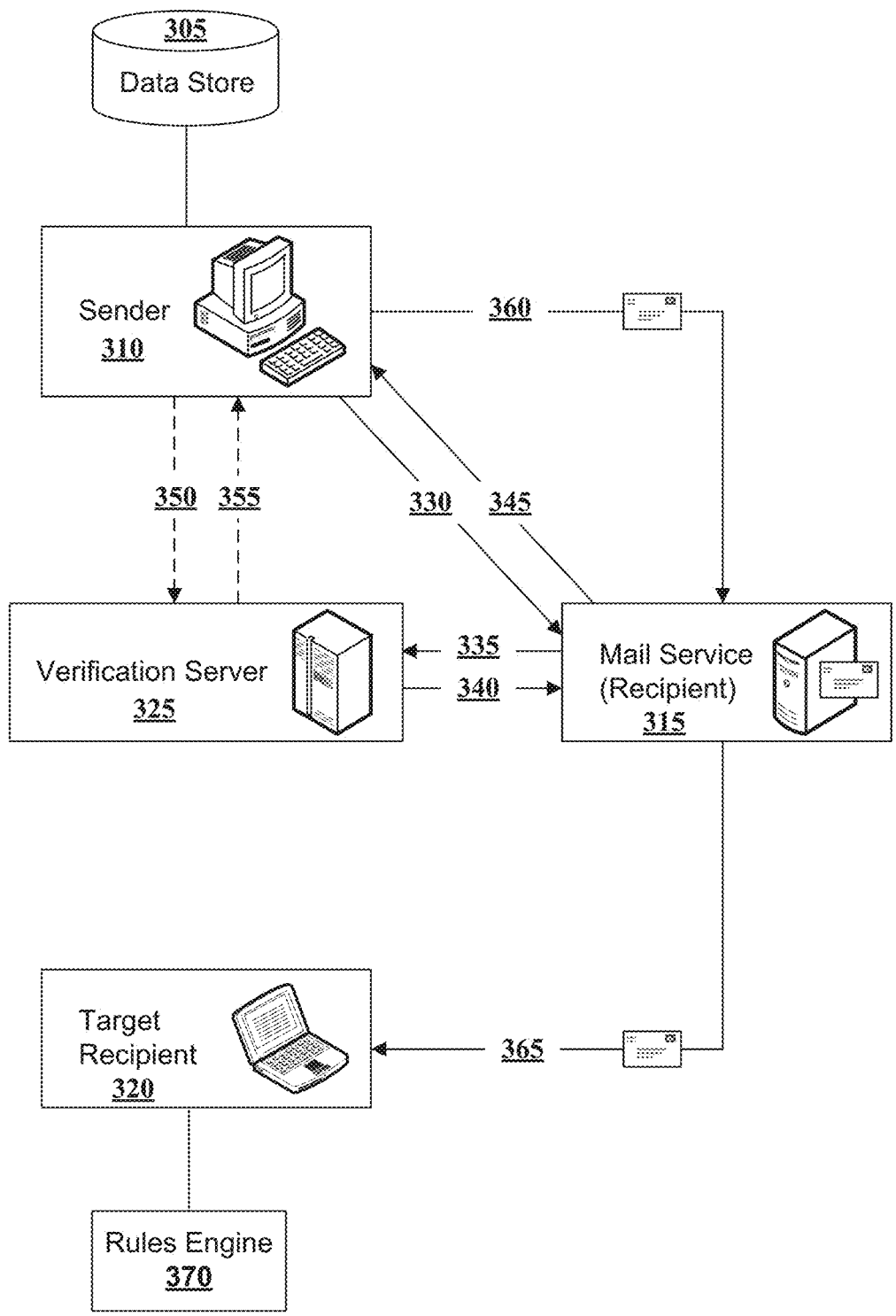
FIG. 3 is an illustration of a permission request sent between a sender and a mail service in accordance with an example of the present technology.

Reference will now be made to FIG. 3 in which a permission request is managed between a sender 310 and a mail service 315. When a sender 310 wishes to begin sending email to a target recipient 320, the sender 310 may transmit a permission request 330 to the target recipient, which request may be an email with fields in a defined format. The permission request may be cryptographically signed using the sender's private key, using asymmetric cryptography. The permission request 330 may be sent via a mail service 315, as illustrated, or sent directly to the target recipient 320 or recipient domain. In this example, because much of the interaction for permissions is between the sender 310 and the mail service 315, the mail service 315 may be referred to as a recipient, and the target of the intended communications may be a target recipient 320. As may be appreciated from this and other examples, the target recipient or an intermediary recipient may perform the operations described herein as belonging to a "recipient".

The sender 310 may request permission to send future electronic communications from the sender's own domain, from a subdomain of the sender 310, from a domain unrelated to the sender's domain, and/or from a bounded set of domains (related to the sender's domain, unrelated to the sender's domain, or including both related and unrelated domains). Where the permission request 330 includes requests for multiple domains or sets of domains, the permission request 330 may optionally enable the recipient to identify select domains from the multiple domains or sets of domains from which the recipient 315 desires to receive communications and/or block communications (i.e., deny permission to send).

The recipient 315 may be a device having memory and a processor to execute computer readable instructions, such as software. The recipient 315 may provide a graphical user interface via a display device to enable a recipient 315 user to interface with the recipient device to view permission requests and respond to permission requests 330. In one example, the recipient 315 may be fully automated and configured to automatically grant or deny permissions in response to permission requests 330 from senders 310. The recipient 315 may have one or more rules for use by the device in determining whether to grant or deny permission to the sender 310. Also, or in the alternative, the recipient device may use a rules engine 370 to enable a user to define rules for use by the device in determining whether to grant or deny permission to the sender 310. In other words, software may present the sender 310 and/or the sender's request 330 to the recipient user or rules engine 370 to grant or deny permissions. Thus, the user or rules engine 370 may evaluate the request 330 and determine whether to grant the sender 310 access to send communications to the target recipient.

In one example, if the recipient 315 denies the request, then no action may be taken or the request may be dropped or deleted. In another example, if the recipient 315 denies the request, then a permission denied communication may be transmitted to the sender 310. If the request is granted, the recipient 315 may compose a permission granted reply 345 and cryptographically sign the reply 345 with the recipient domain's private key. The recipient domain may expose a public key for validation purposes. The recipient 315 may transmit the permission granted reply 345 to the sender.

The sender 310 may record the reply in a data store 305 or repository for email addresses. After receiving a permission grant from multiple recipients, the sender 310 may possess a list of email addresses that may be provable, using modern public/private key cryptography, as having given authorization to the sender 310 for sending electronic communications. The sender 310 may, when changing ISPs (Internet Service Providers) or using a new ESP (Email Service Provider) to send email, present the cryptographic token(s) as evidence that the recipient 315 and target recipient 320 provided consent to receive electronic communications.

In some instances, the recipient 315 may grant the sender 310 access to send communications to the target recipient 320 from the domain name included in the sender's request and the permission grant may not extend to other domains. Thus, if the sender 310 shares a list of email addresses (to which the sender has obtained permission to send communication) with other parties without the recipient's consent, then the other senders may not have authorization to send communications to the recipient. For example, if the present technology were implemented across an industry, identifying and blocking which companies are sharing information without user consent may be simplified because those senders may possess an email address with no corresponding permission grant. As has been described previously, the sender 310 may request permission for a plurality of domains, which may include domains other than the sender's domain(s). In one configuration, the permission grant 345 may provide additional information describing the bounds of the grant. For example, the recipient 315 may grant different permissions for different domains to allow the different domains to send communications to the recipient, but the permitted communications may be restricted to one or more specific types of communications. Additional details regarding example types of permissions will be provided later.

The example illustrated in FIG. 3 differs in some aspects from the previously described examples. Much of the discussion above regarding recipient 315 and sender 310 may be interpreted in terms of the sender 310 and mail service 315 included in the figure. In this example, the actual target recipient 320 does not receive the permission request and is not involved in the negotiation of permissions. In this example, the mail service 315 acts as an intermediary recipient to receive the request 330, analyze the request, validate 335, 340 a request signed with a private sender key using the verification server 325 and, after receiving validation may grant or deny permission to the sender 310 to send communications 360, 365 to the target recipient 320. The mail service 315 may send 345 a permission response signed with a private key for the mail service to the sender 310 which may be validated 350, 355 by the sender 310 and/or stored as a record of the permission. Because the sender has the response signed with the private key for the mail service, the sender 310 may then commence sending communications 360, 365 to the target recipient 320, such as via the mail service 315.

In this example and other examples in this disclosure, reference is made to cryptography, and more specifically to public-key cryptography. By way of explanation, various aspects of public-key cryptography will now be described. However, the explanation is not intended to be limiting and various other forms of cryptography or other technologies for validation of identity may be used in addition to or in the place of the cryptography technology described. Furthermore, various modifications to what is described may also be made and those modifications are considered to be within the scope of this disclosure.

Public-key cryptography generally refers to a cryptographic system involving the use of multiple separate keys (e.g., two separate keys), one of which may be secret (i.e., private) and one of which may be public. The two separate keys may be different from one another and may form a key pair. The different parts of the key pair may be mathematically linked. In some examples, the private key may be usable to generate the public key but the public may not be usable to generate a private key. In sending a communication, one key may be used to encrypt a communication and another of the keys may be used to decrypt the communication. For purposes of the present technology, the permission requests, grants and/or denials may be encrypted or unencrypted as the key may be used for validation of an identity rather than to obfuscate a message. Keys in a key pair may be mathematically linked but the parameters for the keys may be selected such that determining the private key from the public key is effectively impossible or prohibitively expensive (computationally and in terms of time consumption).

Public-key cryptography may use asymmetric key algorithms (such as RSA (Ron Rivest, Adi Shamir and Leonard Adleman)). Public-key cryptography may be based on mathematical relationships such as integer factorization, discrete logarithm problems and so forth, which have no efficient solution. As a result, while key generation, encryption, and decryption using the private key may be a relatively simple process, decrypting a communication using the public key may be very difficult.

Another form of encryption that may be used with the present technology is symmetric encryption. In symmetric encryption, a secret or private key (such as a number, a word, a string of random letters and so forth) is applied to the text of a message to change the content in a particular way, such as by shifting each symbol by a number of places in a symbol set in a simple example. When both the sender and recipient know the private key, both the sender and recipient may encrypt and decrypt any messages that use the private key.

With symmetric encryption, the private keys may be exchanged over a network and a security issue may arise if an unintended party obtains the key. Conventionally with asymmetric encryption, a recipient public key may be made freely available for a sender to use in sending a message to the recipient. The recipient private key may be kept private by the recipient and not exchanged, to avoid security issues related to an unintended party receiving the key.

To use asymmetric encryption, digital certificates may be used to enable discovery of public keys. A digital certificate may be a package of information that identifies a user or a server and may be signed with the private key. The digital certificate may include, for example, information such as the organization name, the organization that issued the certificate, the user's e-mail address and country, the user's internet protocol (IP address, the user's physical address, reference to the user's public key and so forth. When a server and client initiate a communication, a query may be sent over the network by a sender to a recipient and the recipient may send back a copy of the recipient's private certificate. The recipient's public key may be extracted from the certificate or identified based on information within the certificate. The certificate may also be used to uniquely identify the holder of the certificate.

Figure 4:
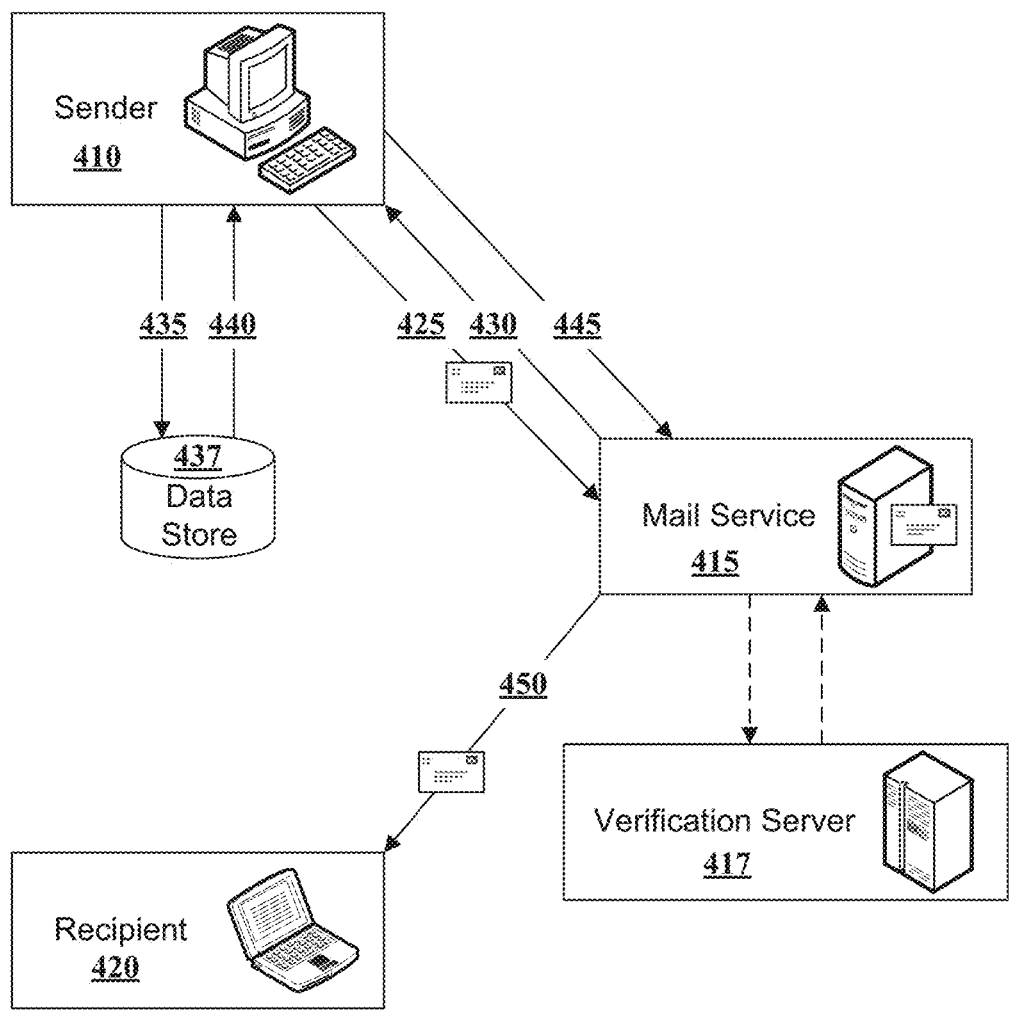
FIG. 4 is an illustration of a send request between a sender and a mail service where the sender provides evidence of permission to send a communication to a recipient in accordance with an example of the present technology.

Referring now to FIG. 4, another example implementation of the present technology is illustrated in which a sender 410 provides evidence to a mail service 415 of permission to send a communication to a recipient 420. In this example, an exchange may have been previously performed between the sender 410 and the recipient 420 in which the recipient granted permission to the sender to send future communications. In this example, the sender 410 may send a request 425 to a mail service 415 to send a communication to one or more email addresses in possession of the sender 410. The mail service 415 may request 430 the sender 410 to demonstrate permission to send the communication to the one or more email addresses before any communications may be passed on by the mail service to the email addresses.

The sender 410, having previously obtained permission responses signed with private keys for the email addresses may request 435 public keys and validate 440 the permission responses stored in a data store 437. The data store 437 may comprise, for example, a data store for storing recipient information including email addresses and responses signed with the private keys, as well as any other available information such as name, age, occupation and/or any other demographic or useful information known about the recipient 420. The data store 437 may be stored locally at a sender 410 device or on a local area network (LAN). Alternatively, the data store 437 may be stored remotely, such as in the at a server cluster and/or optionally at the sender's domain server. The sender 410 may transmit 445 the responses signed with the private keys associated with the email addresses to the mail service 415 as evidence that the sender 410 does have permission to send communications to the email addresses. After receiving the signed responses or permissions from the sender 410, the mail service 415 may verify the signed responses against exposed public keys for the recipients and/or proceed to send 450 the communication to the email addresses requested by the sender 410. In one example, the mail service 415 may include or be in communication with a verification server 417 for verifying the legitimacy of the permissions provided by the sender 410.

Figure 5:
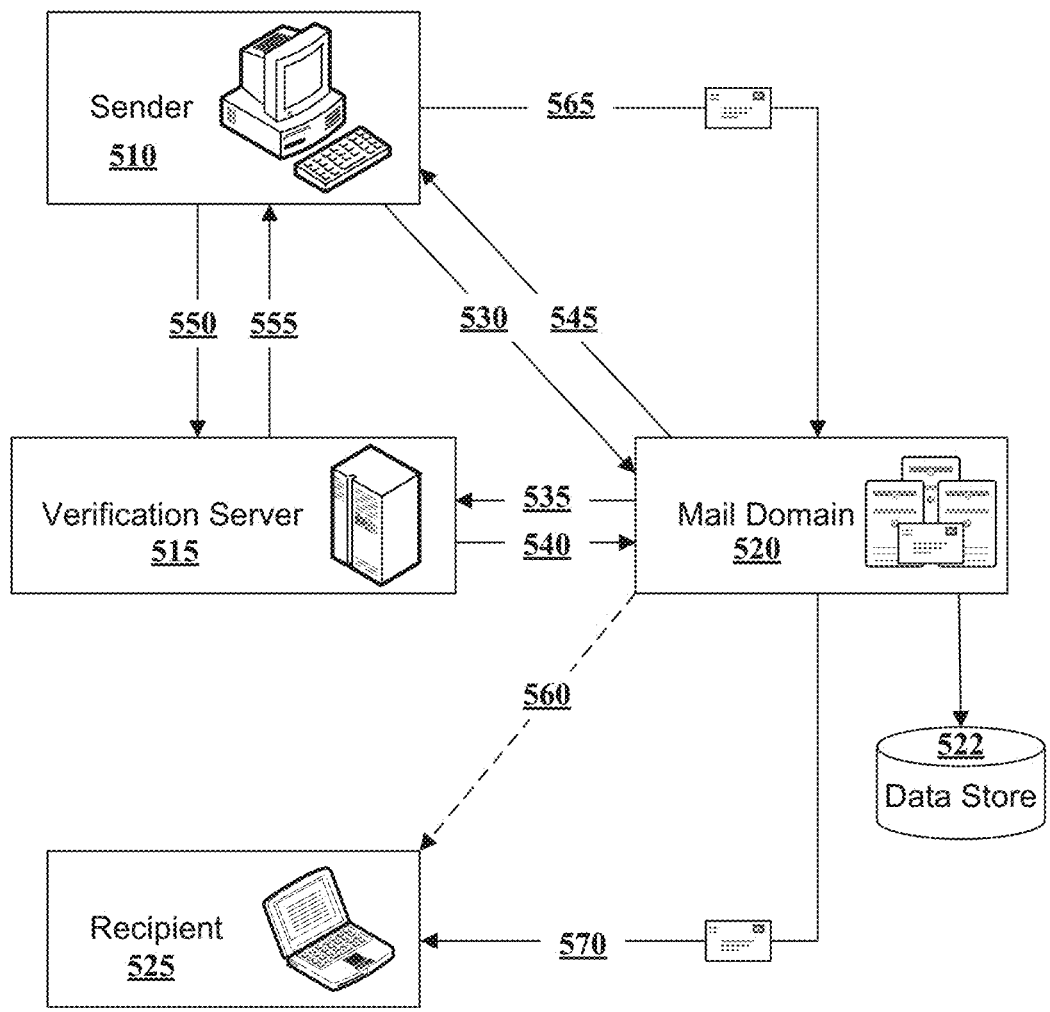
FIG. 5 is an illustration of a permission request between a sender and a mail domain in accordance with an example of the present technology.

Referring to FIG. 5, another example configuration for operation of the present technology is illustrated in which a permission request is managed between a sender 510 and a mail domain 520. In this example, a mail service is not illustrated as with some of the previous examples. While not illustrated, the mail service may optionally be included in such a configuration, such as between the sender 510 and a mail domain 520, and may operate in a manner as described herein.

An electronic communication 530 from a sender 510 to a recipient 525 may be received at a mail domain 520 configured to provide email services to recipient users. The electronic communication 530 may include a permission request for permission to send subsequent electronic communications to the recipient. In this example, the mail domain 520 may act as a gatekeeper between the sender 510 and the recipient 525. Software for analyzing permission requests and for granting or denying permission requests may be executed at the mail domain 520. With this configuration a recipient 525 may not be disturbed by various permissions requests 530 but may simply receive emails 570 for which permissions 545 are granted.

Rather than relying on the mail domain 520 to determine what communications the recipient may or may not be interested in and potentially filtering out wanted communications, the mail domain 520 may be configured to grant permissions to senders 510 which are known to be reliable or trustworthy or optionally to senders 510 whose reliability and/or trustworthiness is unknown or insufficiently established. Senders 510 with an untrustworthy reputation, such as known spammers for example, may be denied permission. If a bar for denial of permission at the mail domain involves a high enough level of undesirable activity, then a recipient 525 may be assured to receive emails from known contacts and even from unknown contacts without an undesirable activity record. While not shown here, the technology may be implemented on a number of different levels. For example, the technology may be implemented between the sender 510 and a mail service, between the sender 510 and the mail domain 520, and/or between the sender 510 and the recipient 525. Thus, even if one level of a communications system provides permission to the sender 510 to proceed with sending communications, a secondary or tertiary level may deny the permission based on various rules at each entity. In one aspect, rules for granting permission may be stricter at each level of communication. For example, a mail service may more readily grant permission to a sender 510 than a mail domain 520; a mail domain may more readily grant permission to a sender 510 than a recipient 525; and so forth. Any desirable number of levels of implementation may be incorporated into the present technology.

Continuing with the discussion of FIG. 5, after receiving a permission request 530 at the mail domain 520 from the sender 510, the mail domain 520 may request 535 and receive 540 the sender public key to validate a request signed with a private key sent by the sender 510 in the request 530. If the mail domain 520 approves the request 530, the permission grant 545 may be transmitted back to the sender, optionally signed with a mail domain private key. The sender 510 may optionally validate the mail domain private key by requesting 550 and receiving 555 a mail domain public key to determine whether the mail domain public key matches the mail domain private key or rather to ascertain whether the mail domain has authority to grant permissions on behalf of the requested email address. The response signed with the mail domain private key may be stored as a record of the permission grant and the sender 510 may send a communication 565, 570 for the recipient. When the mail domain 520 receives the communication 565, the communication may be transmitted 570 to the recipient 525 because the mail domain 520 has granted permission to the sender 510.

Once the mail domain 520 has granted permission 545 to the sender 510 to send the communications 565, the mail domain 520 may optionally notify 560 the recipient 525 that permission has been granted for communications to be sent to the recipient 525. The recipient 525 may optionally be provided with a list-unsubscribe option in the notification to opt out of receiving the communications permitted by the mail domain 520 or to restrict the communications to a subset of the communications permitted by the mail domain 520.

The mail domain 520 may operate as a gatekeeper for the recipients 525 accessible via the mail domain 520, or rather for email addresses or user accounts associated with the mail domain 520. The mail domain 520 may make decisions regarding permissions for senders 510 to send communications to the email addresses or user accounts associated with the mail domain 520 on a domain-wide basis, on the basis of sub-domain identifications or affiliations, on the basis of individual user preferences and so forth. Once the mail domain 520 has granted permission to a sender 510, the mail domain 520 may store a record of the grant of permission to the sender 510 in a data store 522. If the sender 510 sends another request to send electronic communications or simply attempts to send another electronic communication, the mail domain 520 may compare the request or communication with the granted permissions record to determine whether permission has already been granted, or rather that the sender has been previously approved for sending electronic communications. If the sender 510 has been approved, then the mail domain 520 may transmit the electronic communications to the recipients. If the sender 510 has not been approved, then the mail domain 520 may proceed to verify the sender 510 as has been described. In one example, the record of granted permissions may include a permission request signed with the sender private key. If a new request or communication is signed with the same sender private key, then the sender 510 may be identifiable as the approved sender. If the request or communication is signed with a different private key, then the mail domain 520 may proceed to verify the sender 510 as has been described.

Figure 6:
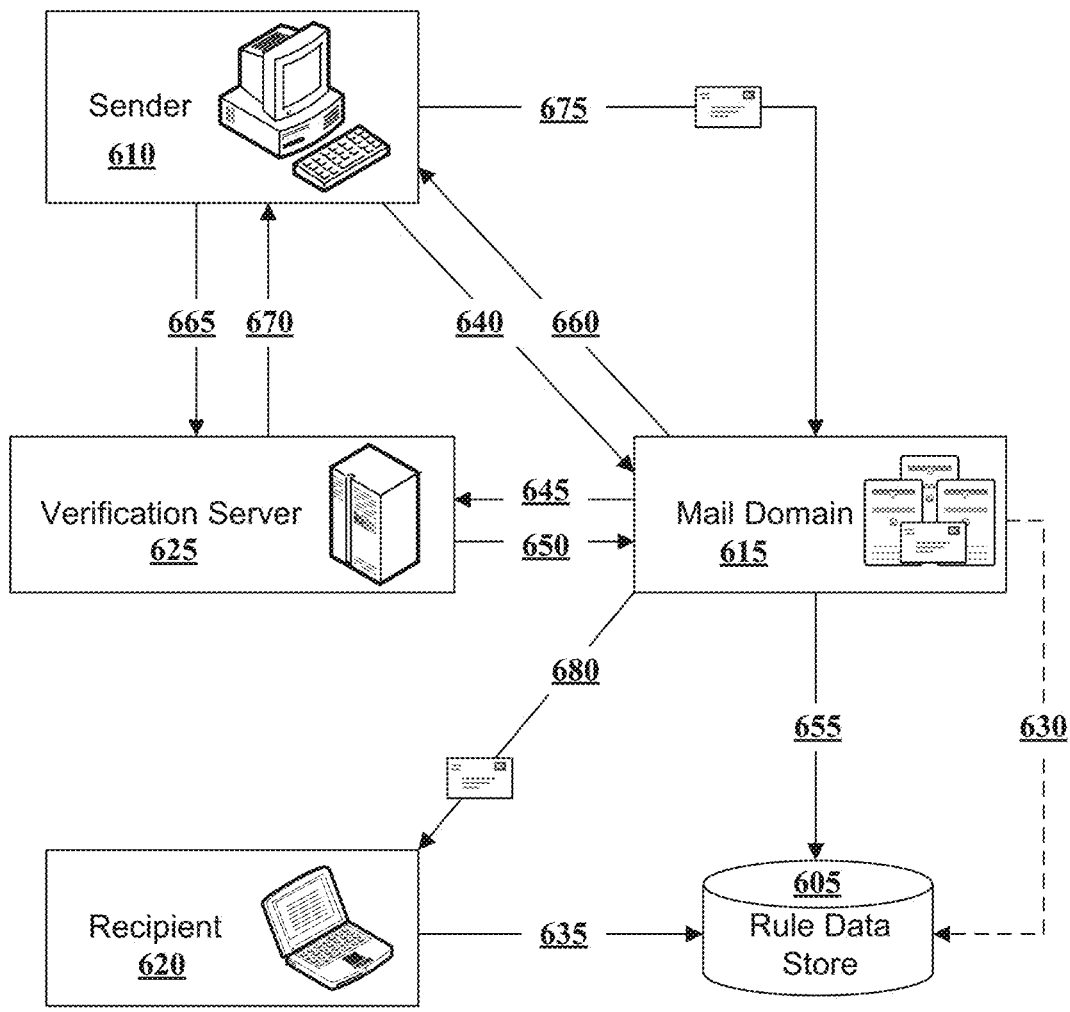
FIG. 6 is an illustration of a permission request between a sender and a mail domain, where permission is based on rules in accordance with an example of the present technology.

Referring to FIG. 6, another implementation of the present technology is illustrated in accordance with an example in which a permission request is managed between a sender 610 and a mail domain 615 and in which permission is based on rules. In this example, a rule data store 605 is provided which is accessible by the recipient 620 and/or the mail domain 615. The rule data store 605 may be populated with one or more rules defining a basis for granting or denying permission to senders 610 to send communications to recipients 620. For example, a mail domain 615 may establish 630 a set of rules as a default configuration. The rules may be defined to deny granting of permissions to entities with an undesirable activity record, such as spammers. The recipient 620 may have access 635 to the rule data store 605 to edit, add or remove rules. Thus, the recipient 620 may modify the default rules included in the rule data store 605 and may create new rules suited to the recipient's preferences.

When the mail domain 615 receives a permission request 640 from a sender 610, the mail domain 615 may initially validate the sender 610 by requesting 645 and obtaining 650 the exposed sender public key from a verification server 625 for comparison with the permission request signed with the sender private key. After successfully validating the sender 610, the mail domain 615 may query 655 the rule data store 605 with the permission request to determine whether any rules are present in the rule data store 605 describing whether to grant or deny permission. The rules may be rules for denying permission, and a default operation in the absence of a rule denying permission for a request may be to grant permission. Thus, if a rule does not prohibit permitting the sender 610 to send communications to the recipient 620, then permission 660 may be granted. The sender 610 may optionally validate 665, 670 a mail domain private key and may proceed to send communications 675, 680 to the recipient via the mail domain 615 as allowed by the mail domain 615.

Figure 7:
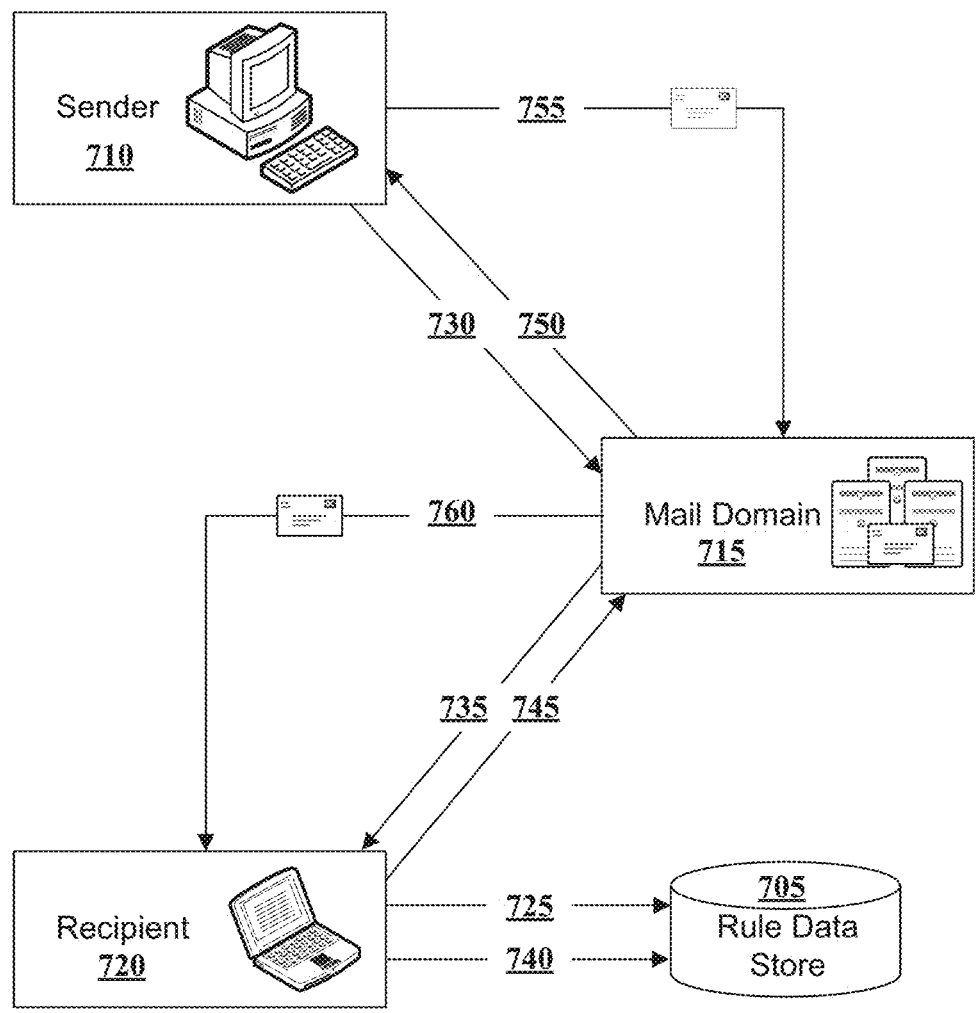
FIG. 7 is an illustration of a permission request between a sender and a recipient, where permission is based on rules in accordance with an example of the present technology.

Referring to FIG. 7, another example configuration for permissions based communication is illustrated in which a permission request is managed between a sender 710 and a recipient 720 and in which permission is based on rules. This example is similar in some regards to the example described above regarding FIG. 6. Specifically, a rule data store 705 is provided for storing rules defining whether to grant permission to a sender 710 to send communications to a recipient 720. The rules in the rule data store 705 may be defined by a recipient 720 or a recipient domain. When the mail domain 715 receives a permission request 730 from a sender 710, the mail domain 715 may communicate 735 the permission request to the recipient 720. The recipient 720 as a device or domain may evaluate the request in light of the rules in the rule data store to determine whether any rules are present in the rule data store 705 describing whether to grant or deny permission.

A decision as to whether to grant or deny permission may be made and may be transmitted 745 to the mail domain 715. The mail domain 715 may act as a gatekeeper under the direction of the recipient's rule data store 705. If a rule in the rule data store 705 prohibits granting of permission, the mail domain 715 may accept the prohibition and prevent future communications from the sender 710 from reaching the recipient 720. Optionally, the mail domain 715 may notify the sender 710 that permission has been denied and that communications will not reach the recipient 720. In the absence of a rule prohibiting communications from the sender, the recipient may transmit 745 a permission grant to the mail domain, which may relay 750 the permission grant to the sender. The sender may then send the desired communication 755, 760 to the recipient 720 via the mail domain 715.

While a verification server or mail service are not included in this figure, the verification server and/or mail service may optionally be involved in a system or process as with other examples described. With this example and other examples, although every feature of the present technology may not be described in connection with a specific example, the discussions of a first example may be applicable to discussions of a second example such that the features of the second example may be considered as incorporated with the discussion of the first example.

Figure 8:
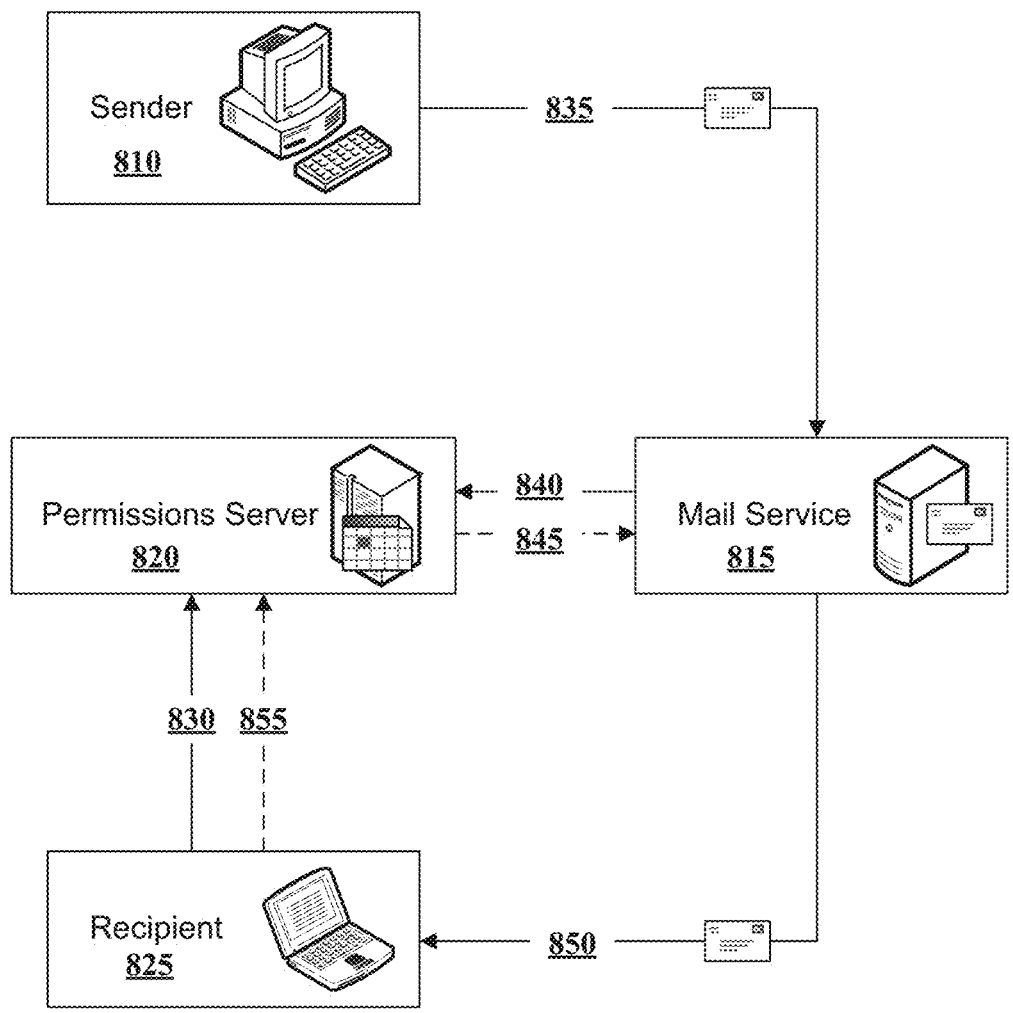
FIG. 8 is an illustration of a send request between a sender and a mail service, where permission to send is checked against a permissions server in accordance with an example of the present technology.

Referring to FIG. 8, an example configuration for permissions based communication is illustrated in which a send request is managed between a sender 810 and a mail service 815, where permission to send is checked against a permissions server 820. While a recipient 825 may grant permission to a sender 810 to send communications, the recipient 825 may wish to narrowly define the permission rather than simply allowing the sender 810 to send any type of communication over any unbounded time frame. In FIG. 8, a permissions server 820 is provided for defining a scope of the permissions. The recipient 825 may access the permissions server and define 830 permissions for individual senders, sender domains, types of communications (e.g., recipient does not want to receive communications from financial institutions), duration/expiration of permissions (e.g., permissions are granted for 6 months) and so forth.

When a sender 810 sends a communication via a mail service 815, the mail service 815 may query 840 the permissions server to determine whether the communication 835 sent by the sender 810 is permitted by the recipient 825. In one aspect, the permission server 820 and the verification server may be in one server and/or the permissions and the public/private key pair may be associated in such a way that the public or private key is used to access or identify the permissions. For example, the public or private key may include a reference to a Uniform Resource Locator (URL) for the permissions server where permissions for the recipient 825 may be viewed or accessed by the sender 810, the mail service 815 or others.

When the mail service 815 in this example queries the permissions server 820, the mail service 815 may learn whether permissions are available to allow the sender 810 to send communications 835 to the recipient 825. If permissions have not yet been granted or if the permission was previously available but is no longer available (such as if the permission has expired), the permissions server may optionally grant 845 a new permission or renew an expired permission. Rules for governing granting new permissions or renewing expired permissions may be defined 830 by the recipient 825. In the absence of defined rules by the recipient, default rules may be used. For example, if permissions were previously granted to a sender 810 on a limited time basis and the time has expired, when a sender 810 attempts to send a communication 835, the permissions server 820 may determine whether a reason exists for the expiration of the permission grant, whether an intervening rule has been defined prohibiting further communications from the sender or whether the permission grant was limited simply to avoid giving an unlimited permission grant to the sender. If a reason exists for the expiration, such as the recipient explicitly defining that the recipient 825 does not desire to receive communications from the sender after the expiration of the time period, or if a rule has been defined which prohibits communications from the sender 810, then permissions will not be granted or renewed. However, if the permission grant was limited simply to avoid giving an unlimited permission grant to the sender 810, then the permission server 820 may renew the permission grant at least for an additional limited time to allow the sender to send additional communications 835, 850 to the recipient 825.

In one aspect, the permissions server 820 may be queried each time the sender 810 attempts to send a communication 835 to the recipient. A benefit of using a validated public key encryption and/or permissions as described is the certainty afforded to email senders that sent communications will reach a valid email destination and that the communications may not be dropped or blocked along the way as unpermitted. This may increase the value of a sender's email list as compared with a list for which the efficiency of delivery is unknown and unquantifiable.

The permissions server 820 and/or the rules data store (described with regards to FIG. 6 or 7) may be used to restrict communications from a sender 810 to communications of a defined type. For example, a two dimensional matrix may be provided to facilitate this restriction or filtering of communications. Table 1 below illustrates an example two dimensional matrix which may be populated by a recipient 825 according to the recipient's preferences.

TABLE 1

| | | Communication Type | | | |
|---|---|---|---|---|---|
| | | Marketing | Sales | Service Announcements | Order Confirmations |
| Domain | example1.com | Yes | Yes | No | No |
| | example2.com | No | No | No | Yes |
| | example3.com | No | No | No | No |
| | example4.com | Ask | Ask | Ask | Ask |

The matrix of Table 1 may list communication types along one axis and domains along another axis. A recipient may select whether to receive communications of a particular type from a particular domain (i.e., "Yes") or to refuse communications of a particular type from a particular domain (i.e., "No"). In one example, an interface may be provided for the recipient to define a number of desired permissions with an option to define permissions for specific domains and communication types. The recipient 825 may choose to fill undefined service announcement cells of a particular type, undefined domain cells for a particular domain, or each undefined cell. The recipient 825 may be provided with any of a number of conceivable options for completing the matrix. For example, the recipient 825 may indicate 'yes' or 'no' to receive or block communications. As another example, the recipient 825 may indicate 'ask' to be asked whether to permit a communication type or communication from a domain when sent. In one example, the matrix may be automatically populated based on an email history of the recipient. In another example, a mail domain may store a three-dimensional matrix similar to the two-dimensional matrix established by the recipient. The three-dimensional matrix may include the two dimensions described above which are available to an individual recipient 825 and a third dimension which includes the each of the recipients at the mail domain.

The permission requests and/or electronic communications 835 from the sender 810 may include any of a number of various fields, such as an email address, a recipient name, and so forth. In one example, the request may contain a field describing who the sender thinks the recipient is using information believed to be known about the recipient. The request may be evaluated at a mail service 815, mail domain, permission server, recipient 825 or the like based on what fields are present in the request. For example, requests may be approved if the sender knows the recipient's name, address, occupation, phone number or personal information, but otherwise the request may be denied. Such a rule may be included in the rules data store and/or in the matrix described above.

The mail service 815 may have access to rules and/or recipient data, such as the recipient name for example, or may defer enforcement of rules to a recipient device or a recipient domain. The mail service 815 may be able to use keys, electronic certificates, accessible rules or other items indicative of whether the sender has permission to send communications to the recipient. Verifying the permissions may enable the mail service 815 to determine whether a list from a sender 810 is likely legitimately obtained or not. When the sender 810 does not have or does not provide evidence of permissions to send communications to the recipient 825, the mail service 815 may optionally request permissions from the recipients 825 on behalf of the sender 810. The mail service 815 may then manage received permissions and/or forward the permissions to the sender 810.

The use of signatures, encryption and so forth may be useful in examples where a mail service 815 is utilized between the sender 810 and the recipient 825. However, as has been described and illustrated, such as in FIG. 1, direct communications may be held between a sender 810 and a recipient 825. The recipient 825 may provide a permission to the sender 810, which may then be retained and used as evidence of permission to send communications to the recipient. For example, an email permission feature may be accessed through a graphical user interface which enables the creation of a permission grant. A button, radio, drop-down box, fillable text box or any other suitable element may be provided by which a recipient may easily reply or click to grant permission to the sender 810 without the use of encryption, digital signatures and so forth.

As another example, after receiving a communication 850 from the sender 810, the recipient 825 may redefine 855 permissions on the permissions server 820 to modify permissions for future communications 835 from the sender 810.

Figure 9:
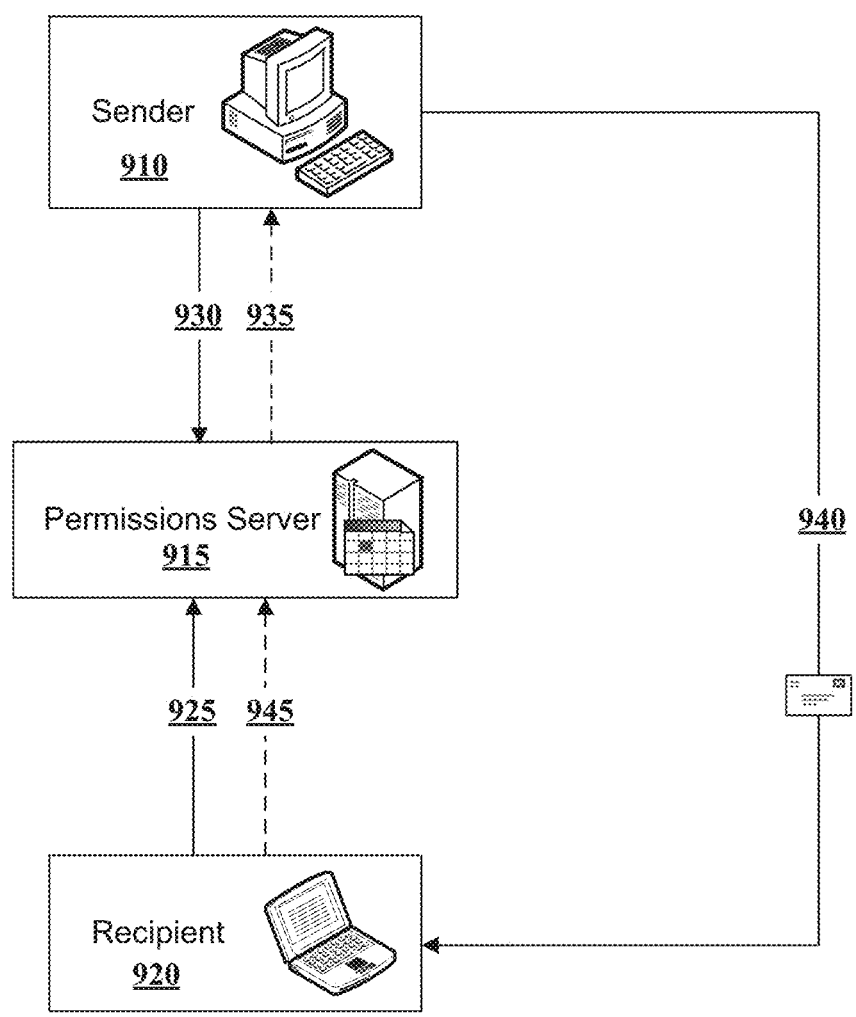
FIG. 9 is an illustration of a send request between a sender and a recipient, where permission to send is checked against a permissions server in accordance with an example of the present technology.

Referring to FIG. 9, an example implementation of the present technology is illustrated for communications between a sender 910 and a recipient 920 in which a send request is managed between the sender 910 and the recipient 920, and where permission to send is checked against a permissions server. In this example, communications 940 may be transmitted between the sender 910 and recipient 920 after permissions have been granted to the sender 910 to send the communication 940. The recipient 920 may define 925 permissions at a permission server 915 which may be transmitted 935 to or may accessible 930 by the sender. The recipient 920 may be enabled to redefine 945 permissions at some point after the initial definition to modify the permissions of the sender in sending the communications.

In one example, S/MIME (Secure/Multipurpose Internet Mail Extensions) may be used to enable an individual recipient to sign his/her own message if the recipient has his/her own key to use. In other examples, the present technology may be implemented at a domain level using DKIM (domain keys identified mail). In this example, trust between the sender and the recipient may be established at the domain. In another example, the domain may provide a tool by which the recipient may create a grant or re-define the scope of a grant. The recipient may instruct the domain to issue the grant to the sender and the domain may sign the grant using the domain's private key.

Figure 10:
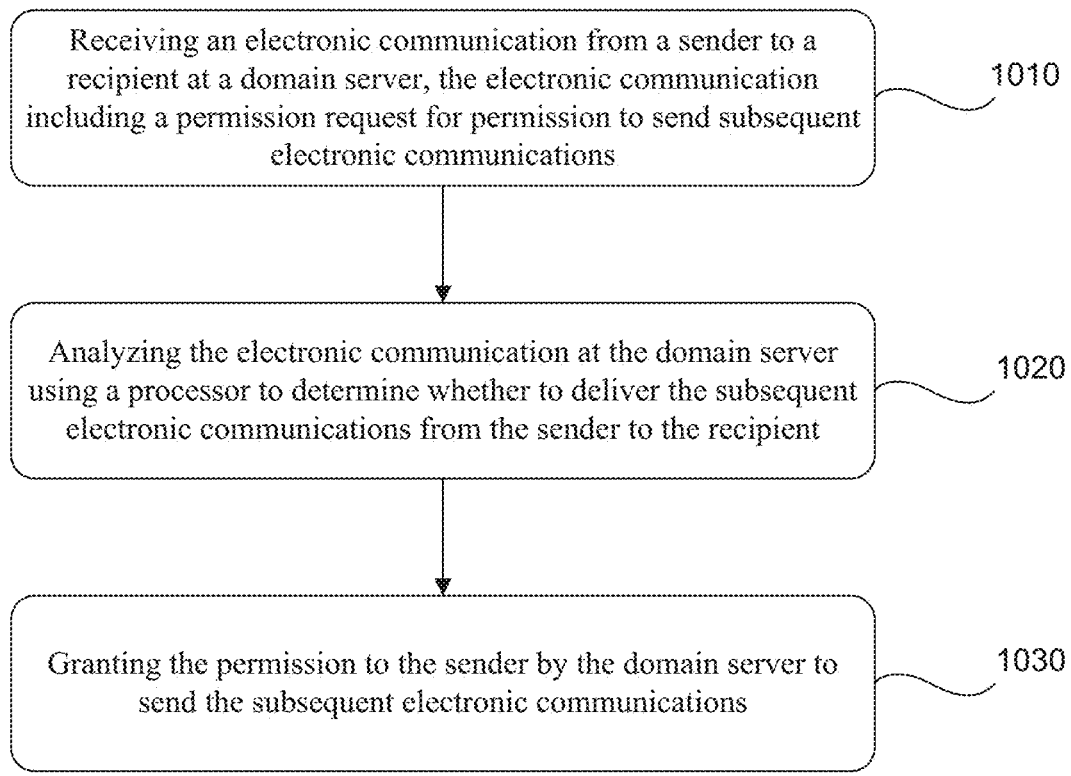
FIG. 10 is a flow diagram of a method for permissions based communication involving a domain server in accordance with an example of the present technology.

Referring to FIG. 10, a flow diagram of a method for permissions based communication is illustrated in accordance with an example of the present technology. The method may include receiving 1010 an electronic communication from a sender to a recipient at a domain server including a permission request for permission to send subsequent electronic communications. The electronic communication may be signed with a sender private key. The electronic communication may be analyzed 1020 at the domain server to determine whether to deliver the subsequent electronic communications from the sender to the recipient. Permission may be granted 1030 or denied to the sender by the domain server to send the subsequent electronic communications. When the permission is granted, the permission may be sent to the sender. The permission may be signed with a recipient private key of a recipient asymmetric key pair or with a private key of the domain server. A recipient public key of the recipient asymmetric key pair may be exposed for the sender to validate the recipient private key. Similarly, the request from the sender may be signed with a sender private key of a sender asymmetric key pair which may be used by the recipient or domain server against a sender public key of the sender asymmetric key pair to validate the request.

Figure 11:
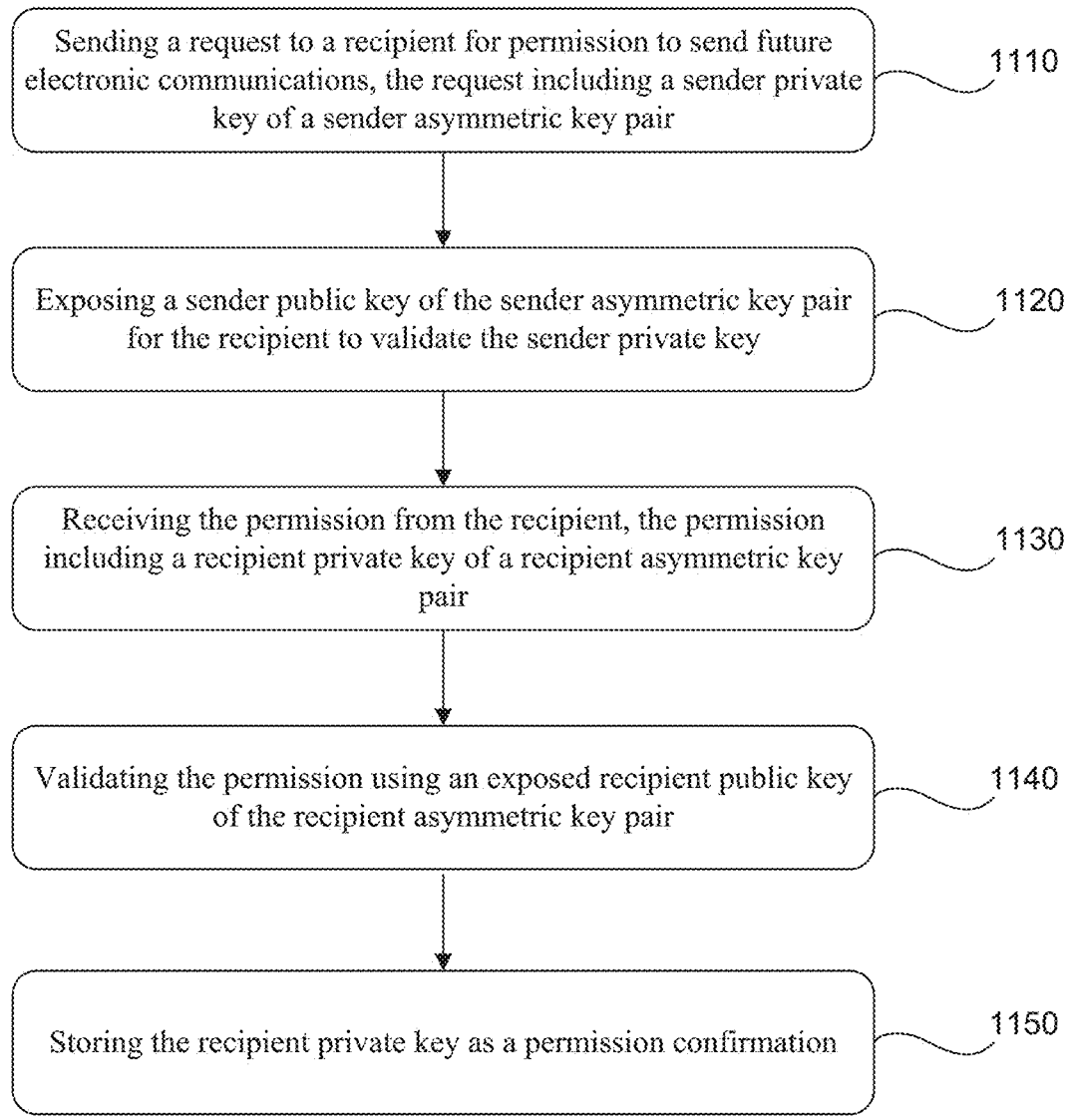
FIG. 11 is a flow diagram of a method for permissions based communication from a sender perspective in accordance with an example of the present technology.

Referring to FIG. 11, a flow diagram of a method for permissions based communication is illustrated in accordance with another example of the present technology. The method may include sending 1110 a request to a recipient for permission to send future electronic communications. The request may be signed with a sender private key of a sender asymmetric key pair. The method may include exposing 1120 a sender public key of the sender asymmetric key pair for the recipient to validate the sender private key. After permission from the recipient is received 1130, the sender may validate 1140 the permission, which may be signed with a recipient private key, using an exposed recipient public key of the recipient asymmetric key pair. The permission signed with the recipient private key may be stored 1150 in a data store as a permission confirmation for the sender.

The method may include requesting permission to send future electronic communications from an identified domain such as the sender's domain and/or from a different domain than a domain from which the request is sent.

The method may involve a third-party mailing service. For example, the permission may be provided to the third-party mailing service as authorization for the sender to send the future electronic communications.

The method may include verifying an expiration status of the permission, such as by referencing or accessing a secure or non-secure hypertext transfer protocol (HTTP or HTTPS)

URL (i.e., a network address) included with digital license of encryption key. The sender may send the communications when the permission has a valid status. The method may include renewing the permission at the network address when the permission has an expired status.

Figure 12:
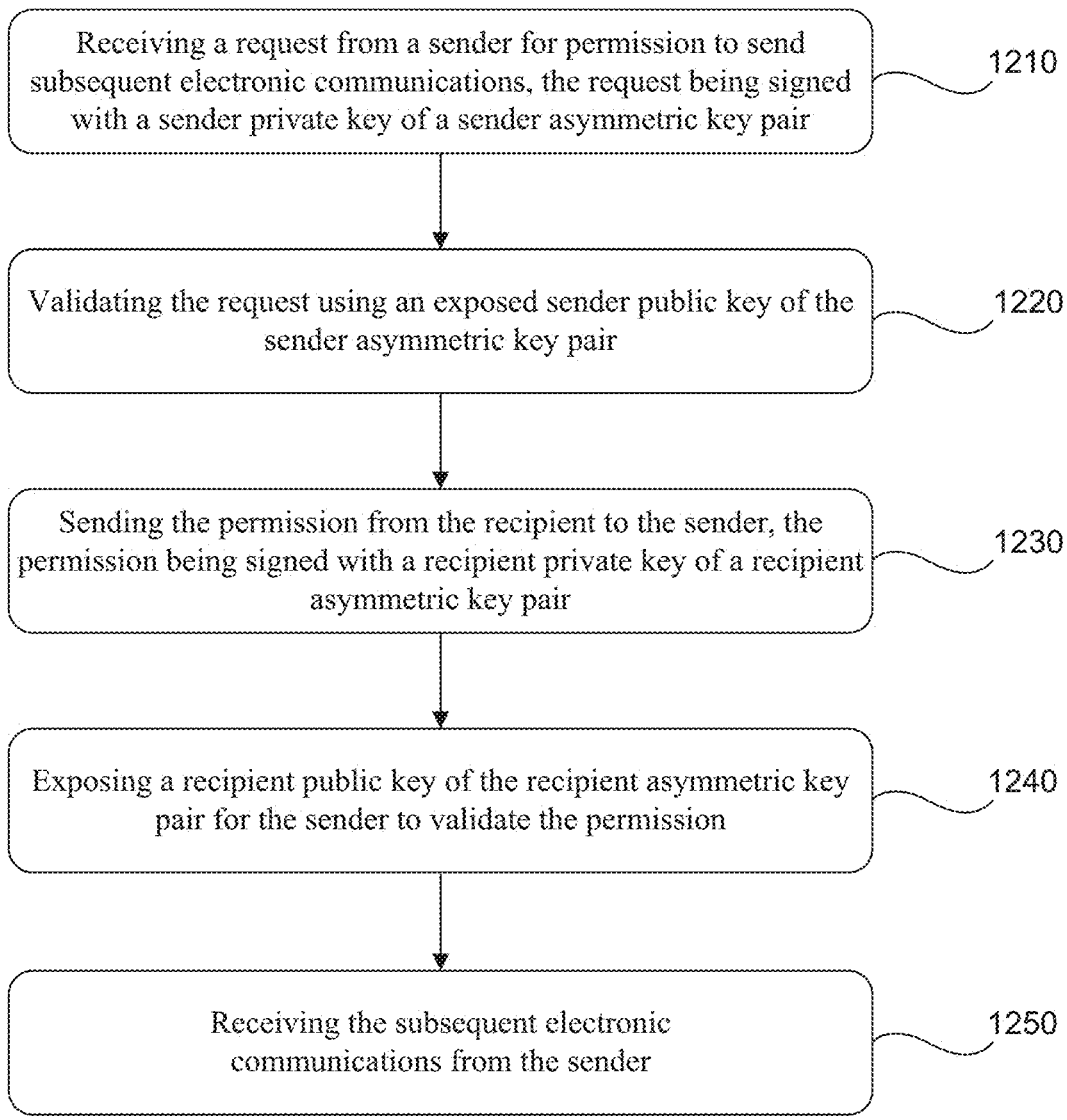
FIG. 12 is a flow diagram of a method for permissions based communication from a recipient perspective in accordance with an example of the present technology.

Referring to FIG. 12, a flow diagram of a permissions based communication method is illustrated in accordance with another example of the present technology. The method may include receiving 1210 a request from a sender for permission to send subsequent electronic communications. The request may be signed with a sender private key of a sender asymmetric key pair. The request may be validated 1220 using an exposed sender public key of the sender asymmetric key pair and permission may be sent 1230 from the recipient to the sender and may be signed with a recipient private key of a recipient asymmetric key pair. A recipient public key of the recipient asymmetric key pair may be exposed 1240 for the sender to validate the permission. Electronic communications may subsequently be received 1250 from the sender.

The method may include analyzing the request and granting or denying the request. For example, the request may be granted in full when the request satisfies a set of predetermined rules for grant. The request may be granted in part when the request satisfies a subset of the predetermined rules. In other words, permissions may be granted to the sender more narrowly than were requested. For example, the sender may request to send multiple types of communications and permissions may be given for some of the communication types and may be denied for other of the communication types. The request may be denied when the request fails to satisfy any of the predetermined rules or otherwise violates one or more of the rules.

The method may include setting a permission expiration time that is accessible and renewable at a network address by the sender and sending the permission expiration time to the sender.

In one example, the method may include intercepting the request at a recipient domain for a plurality of recipients, analyzing the request, and granting or denying the request for the plurality of recipients.

Figure 13:
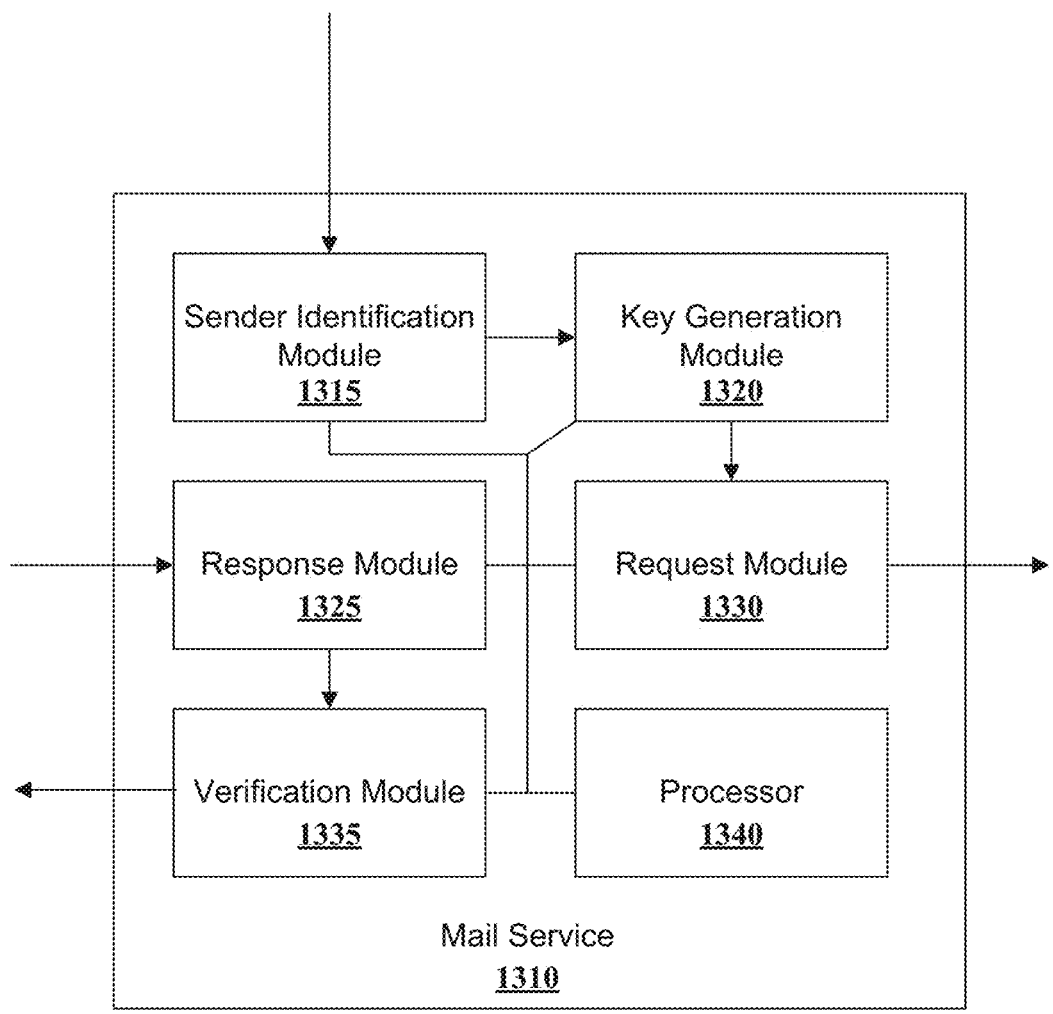
FIG. 13 is a block diagram of a mail service permissions system in accordance with an example of the present technology.

Referring to FIG. 13, a block diagram of a mail service system for permissions based communication is illustrated in accordance with an example. The system may reside on or be implemented on a mail service 1310 operable to deliver communications from a sender to a recipient. The system may include a sender identification module 1315 to receive a request to send a communication to a recipient and sender identification identifying the sender. The mail service may analyze the sender identification to determine whether the sender is known to be trustworthy. The sender identification module 1315 may also identify an email list supplied by the sender to determine whether the list was legitimately obtained or includes evidence of permission to use. If the sender does not have a sender key, the mail service 1310 may include a key generation module 1320 configured generate a sender public key pair. The mail service 1310 may send a permission request to the recipient on behalf of the sender using a request module 1330, the request being signed with a private key of the key pair. A response module 1325 may be configured to receive a response from the recipient. The response module 1325 may identify what permissions, if any, are granted to the sender for sending communications to the recipient. A verification module 1335 may optionally be used by the mail service 1310 to verify permissions for a previous permission grant evidenced by the sender or to verify a recipient private key with which the grant may be signed against a recipient public key. The mail service 1310 may utilize a processor 1340 and memory to perform the operations described.

Figure 14:
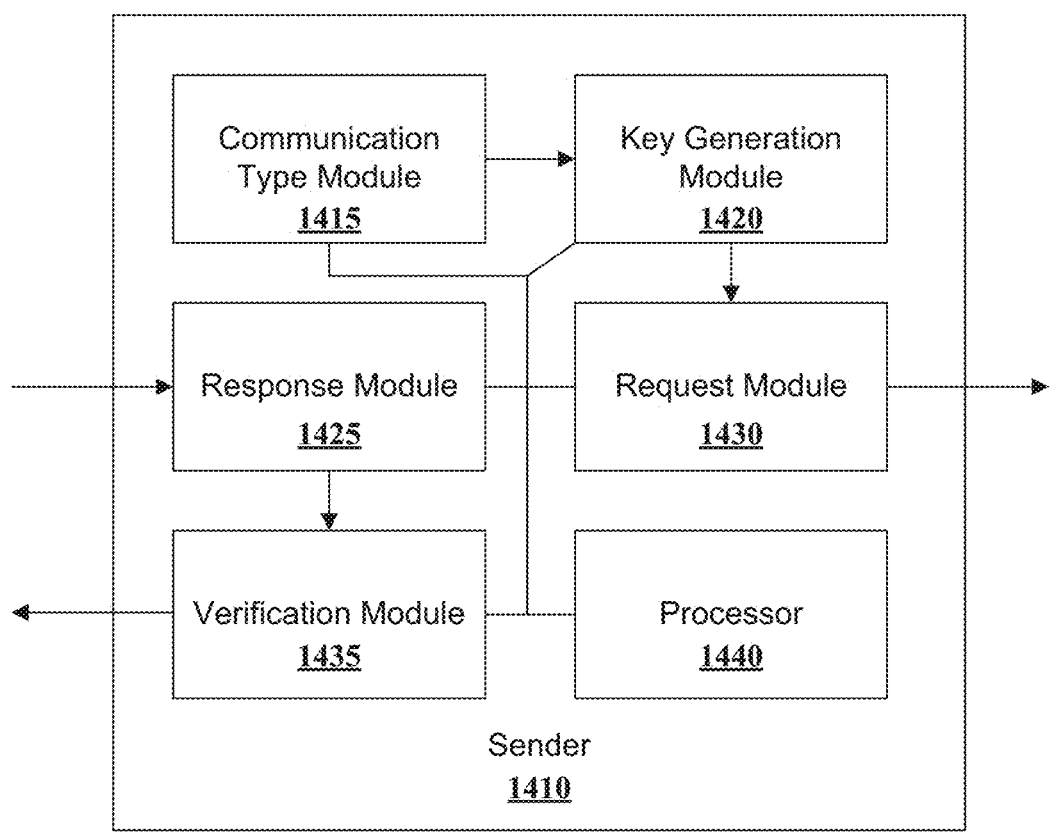
FIG. 14 is a block diagram of a sender permissions system in accordance with an example of the present technology.

FIG. 14 illustrates a block diagram of a sender 1410 system for permissions based communication in accordance with another example. The sender may include a communication type module 1415 for identifying a type of communication the sender desires to send to a recipient. A key generation 1420 module may be utilized to generate a sender key pair, of which a private key may be used to sign a permission request to be sent to the recipient using a request module 1430. A response from a recipient (or intervening entity such as a mail service, mail domain etc.) may be received at a response module 1425. A verification module 1435 may be used to verify a recipient private key with which the grant is signed against a recipient public key. The sender may utilize a processor 1440 and memory to perform the operations described.

Figure 15:
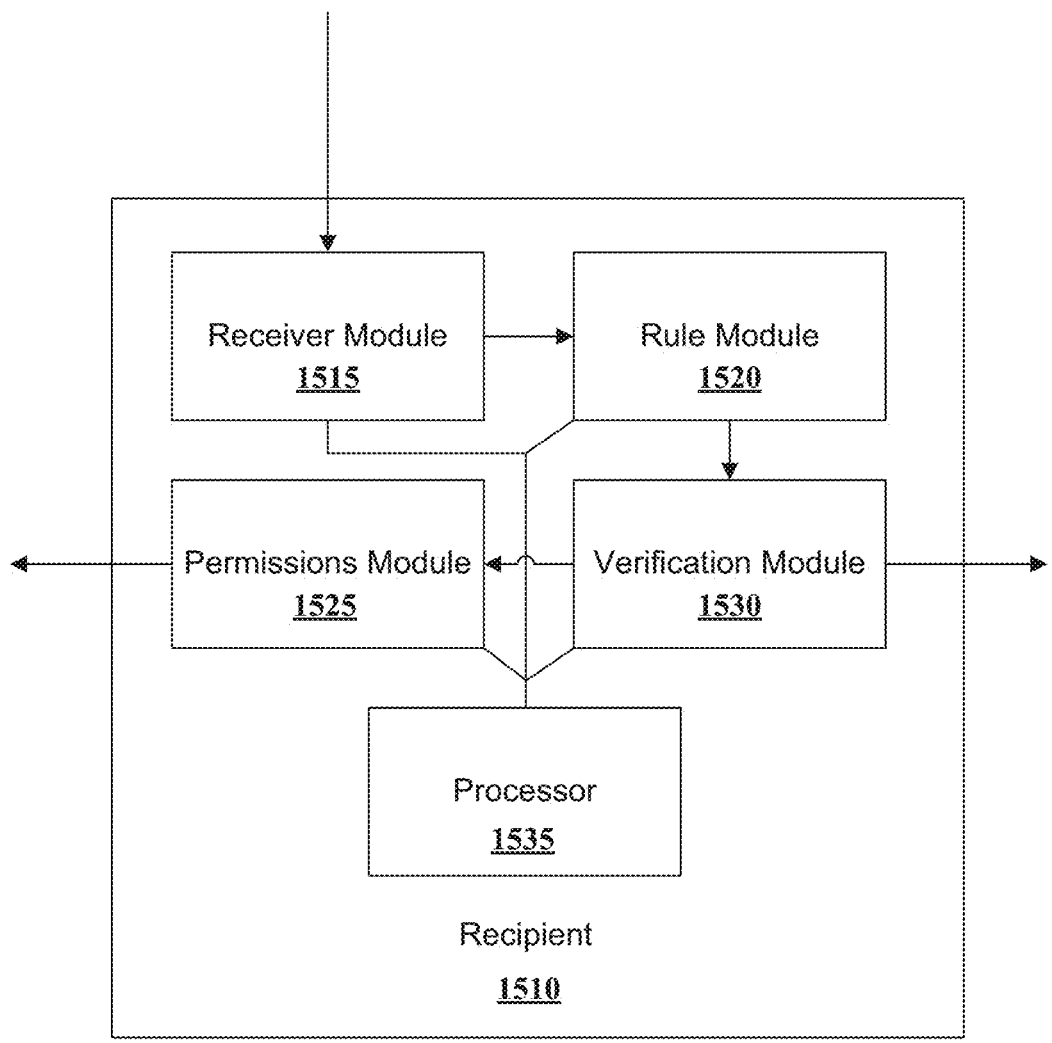
FIG. 15 is a block diagram of a recipient permissions system in accordance with an example of the present technology.

FIG. 15 illustrates a block diagram of a recipient 1510 system for permissions based communication in accordance with another example. In this example, a permission request may be received at a receiver module 1515. The receiver module 1515 may compare the request against rules in a rule data store using a rule module 1520 to determine whether the request is grantable. A verification module 1530 may validate a sender private key with which the permission request is signed against an exposed sender public key. A permissions module 1525 may grant or deny permission based on a result obtained by the rule module 1520 and/or the verification module 1530, and the permissions module 1525 may send the grant or denial of permission to the sender. The recipient 1510 may utilize a processor 1535 and memory to perform the operations described.

Figure 16:
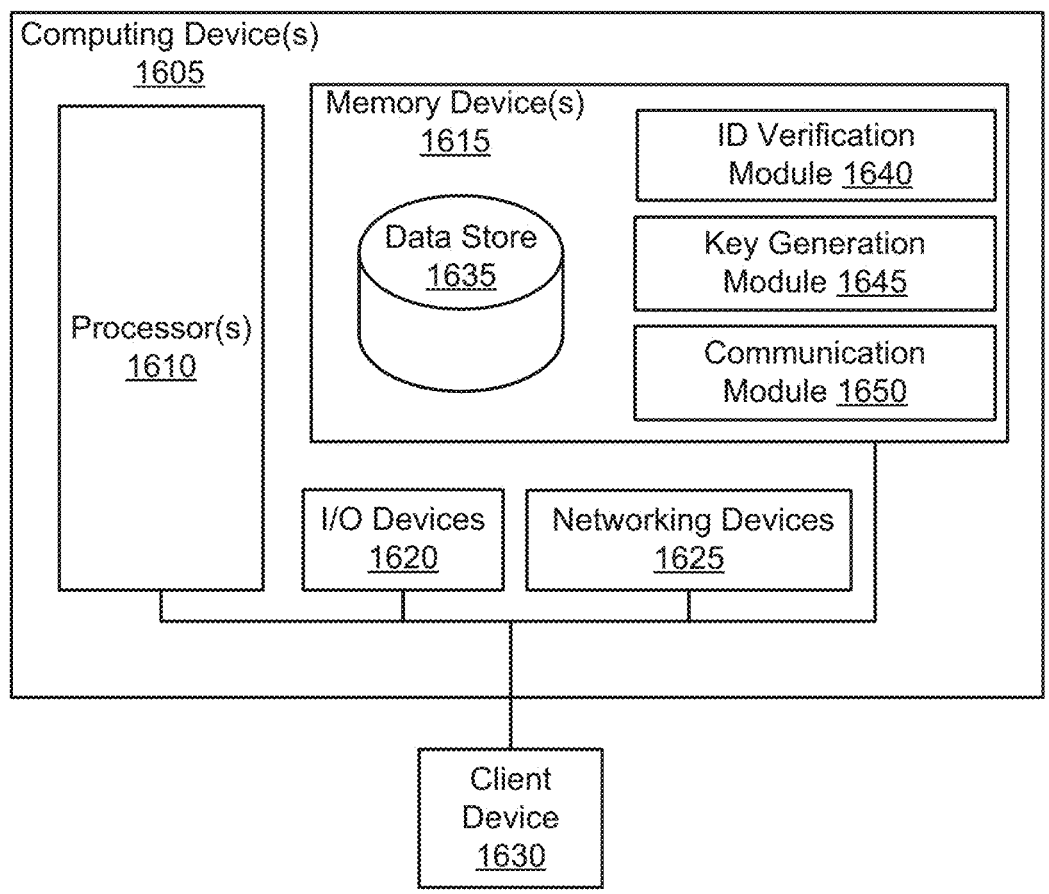
FIG. 16 is a block diagram of a permissions system in accordance with an example of the present technology.

Referring to FIG. 16, a block diagram of a permissions based system is illustrated in accordance with another example. The system includes an identification (ID) verification module 1640 to identify a sender requesting to send electronic communications to a recipient or a recipient responding to a permissions request. A key generation module 1645 may be used to generate a sender asymmetric key pair for the sender when the sender asymmetric key pair is unavailable from the sender. A communication module 1650 may be used to send a request to the recipient for permission to send the electronic communications to the recipient as from the sender, which request may be signed with or include part of the sender asymmetric key pair, such as the private key. The communication module may alternately send or receive a response from the recipient and identify a part of a recipient asymmetric key pair when the response includes the permission, such as by checking the part of the key pair included in the request or with which the request is signed against a public part of the key pair. The ID verification module 1640 may be further configured to verify permissions from recipients when the sender provides a list of recipients with a request to send the electronic communications to the list of recipients.

The modules that have been described may be stored on, accessed by, accessed through, or executed by a computing device 1605. The computing device 1605 may comprise, for example, a server computer or any other system providing computing capability. Alternatively, a plurality of computing devices may be employed that are arranged, for example, in one or more server banks, blade servers or other arrangements. For example, a plurality of computing devices together may comprise a cloud computing resource, a grid computing resource, and/or any other distributed computing arrangement. Such computing devices may be located in a single installation or may be distributed among many different geographical locations. For purposes of convenience, the computing device 1605 is referred to herein in the singular form. Even though the computing device 1605 is referred to in the singular form, however, it is understood that a plurality of computing devices may be employed in the various arrangements described above.

Various applications and/or other functionality may be executed in the computing device 1605 according to various embodiments, which applications and/or functionality may be represented at least in part by the modules that have been described. Also, various data may be stored in a data store 1635 that is accessible to the computing device. The data store 1635 may be representative of a plurality of data stores as may be appreciated. The data stored in the data store 1635, for example, is associated with the operation of the various applications and/or functional entities described. The components executed on the computing device 1605 may include the modules described, as well as various other applications, services, processes, systems, engines or functionality not discussed in detail herein.

The term "data store" may refer to any device or combination of devices capable of storing, accessing, organizing and/or retrieving data, which may include any combination and number of data servers, relational databases, object oriented databases, simple web storage systems, cloud storage systems, data storage devices, data warehouses, flat files and data storage configuration in any centralized, distributed or clustered environment. The storage system components of the data store may include storage systems such as a SAN (Storage Area Network), cloud storage network, volatile or non-volatile RAM, optical media or hard-drive type media.

The client device 1630 shown in FIG. 16 may be representative of a plurality of client devices that may be coupled to a network. The client devices may communicate with the computing device 1605 over any appropriate network, including an intranet, the Internet, a cellular network, a local area network (LAN), a wide area network (WAN), a wireless data network or a similar network or combination of networks.

Each client device 1630 may be embodied, for example in the form of a client computer, a desktop computer, a laptop computer, a mobile device, a hand held messaging device, a set-top box, heads up display (HUD) glasses, a car navigation system, personal digital assistants, cellular telephones, smart phones, set-top boxes, network-enabled televisions, music players, web pads, tablet computer systems, game consoles, electronic book readers or other devices with like capability, including capabilities of receiving and presenting content from a server. Each client device 1630 may include a respective display. The display may comprise, for example, one or more devices such as cathode ray tubes (CRTs), liquid crystal display (LCD) screens, gas plasma based flat panel displays, LCD projectors, or other types of display devices, etc.

Although a specific structure may be described herein that defines server-side roles (e.g., of content delivery service) and client-side roles (e.g., of the content access application), it is understood that various functions may be performed at the server side or the client side.

Certain processing modules may be discussed in connection with this technology. In one example configuration, a module may be considered a service with one or more processes executing on a server or other computer hardware. Such services may be centrally hosted functionality or a service application that may receive requests and provide output to other services or customer devices. For example, modules providing services may be considered on-demand computing that is hosted in a server, cloud, grid or cluster computing system. An application program interface (API) may be provided for each module to enable a second module to send requests to and receive output from the first module. Such APIs may also allow third parties to interface with the module and make requests and receive output from the modules. Third parties may either access the modules using authentication credentials that provide on-going access to the module or the third party access may be based on a per transaction access where the third party pays for specific transactions that are provided and consumed.

The computing device 1605 may include one or more processors 1610 that are in communication with memory devices 1615. The computing device 1605 may include a local communication interface for the components in the computing device 1605. For example, the local communication interface may be a local data bus and/or any related address or control busses as may be desired.

The memory device 1615 may contain modules that are executable by the processor(s) and data for the modules. Located in the memory device 1615 are modules executable by the processor 1610. The data store 1635 may also be located in the memory device 1615 for storing data related to the modules and other applications along with an operating system that is executable by the processor(s) 1610.

Various applications may be stored in the memory device and may be executable by the processor(s) 1610. Components or modules discussed in this description that may be implemented in the form of software using high programming level languages that are compiled, interpreted or executed using a hybrid of the methods.

The computing device 1605 may also have access to I/O (input/output) devices 1620 that are usable by the computing devices 1605. An example of an I/O device 1620 is a display screen that is available to display output from the computing devices. Other known I/O devices 1620 may be used with the computing device 1605 as desired. Networking devices 1625 and similar communication devices may be included in the computing device 1605. The networking devices 1625 may be wired or wireless networking devices that connect to the internet, a LAN, WAN, or other computing network.

The components or modules that are shown as being stored in the memory device 1615 may be executed by the processor 1610. The term "executable" may mean a program file that is in a form that may be executed by a processor. For example, a program in a higher level language may be compiled into machine code in a format that may be loaded into a random access portion of the memory device and executed by the processor, or source code may be loaded by another executable program and interpreted to generate instructions in a random access portion of the memory to be executed by a processor. The executable program may be stored in any portion or component of the memory device. For example, the memory device may be random access memory (RAM), read only memory (ROM), flash memory, a solid state drive, memory card, a hard drive, optical disk, floppy disk, magnetic tape, or any other memory components.

The processor 1610 may represent multiple processors and the memory may represent multiple memory units that operate in parallel to the processing circuits. This may provide parallel processing channels for the processes and data in the system. The local interface may be used as a network to facilitate communication between any of the multiple processors and multiple memories. The local interface may use additional systems designed for coordinating communication such as load balancing, bulk data transfer, and similar systems.

The present technology may facilitate a more reliable estimation of delivered electronic communications and a more reliable delivery of said communications because recipients may opt in to receive communications from the sender and/or communications of the type being sent by a sender. This may result in a higher deliverability rate overall as compared with other services. The technology may be used to identify, for example, to how many email addresses in an email address list a particular type of communication from a particular domain will be deliverable. The technology may provide various benefits as compared with other existing technologies and may address some of the shortcomings of existing technologies.

While the flowcharts presented for this technology may imply a specific order of execution, the order of execution may differ from what is illustrated. For example, the order of two more blocks may be rearranged relative to the order shown. Further, two or more blocks shown in succession may be executed in parallel or with partial parallelization. In some configurations, one or more blocks shown in the flow chart may be omitted or skipped. Any number of counters, state variables, warning semaphores, or messages might be added to the logical flow for purposes of enhanced utility, accounting, performance, measurement, troubleshooting or for similar reasons.

Some of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The technology described here may also be stored on a computer readable storage medium that includes volatile and non-volatile, removable and non-removable media implemented with any technology for the storage of information such as computer readable instructions, data structures, program modules, or other data. Computer readable storage media include, but is not limited to, RAM, ROM, EEPROM, flash memory or other memory technology, CD-ROM, digital versatile disks (DVD) or other optical storage, magnetic cassettes, magnetic tapes, magnetic disk storage or other magnetic storage devices, or any other computer storage medium which may be used to store the desired information and described technology. As used herein, the terms "medium" and "media" may be interchangeable with no intended distinction of singular or plural application unless otherwise explicitly stated. Thus, the terms "medium" and "media" may each connote singular and plural application.

The devices described herein may also contain communication connections or networking apparatus and networking connections that allow the devices to communicate with other devices. Communication connections are an example of communication media. Communication media typically embodies computer readable instructions, data structures, program modules and other data in a modulated data signal such as a carrier wave or other transport mechanism and includes any information delivery media. A "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes communication media.

Reference was made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

What is claimed is:

1. A computing device that is configured to implement a permissions based communication method, comprising:
 a processor;
 a memory in electronic communication with the processor;
 instructions stored in the memory, the instructions being executable by the processor for:
 receiving a request from a sender for permission for the sender to send subsequent electronic communications, the request being signed with a sender private key of a sender asymmetric key pair;

validating the sender private key using an exposed sender public key of the sender asymmetric key pair;

sending the permission from a recipient to the sender, the permission being signed with a recipient private key of a recipient asymmetric key pair;

exposing a recipient public key of the recipient asymmetric key pair for the sender to validate the recipient private key;

setting a permission expiration time that is accessible and renewable at a permissions server at a network address by the sender; and receiving the subsequent electronic communications from the sender.

2. The method implemented by the computing device of claim 1, further comprising analyzing the request and granting or denying the request.

3. The method implemented by the computing device of claim 2, further comprising granting the request in full when the request satisfies a set of predetermined rules.

4. The method implemented by the computing device of claim 2, further comprising granting the request in part when the request satisfies a subset of a set of predetermined rules, the predetermined rules being stored in a rules data store for use in evaluating the request and determining whether to grant or deny permission to the sender.

5. The method implemented by the computing device of claim 2, further comprising denying the request when the request fails to satisfy any predetermined rules, the predetermined rules being stored in a rules data store for use in evaluating the request and determining whether to grant or deny permission to the sender.

6. The method implemented by the computing device of claim 2, wherein:

granting or denying the request comprises granting or denying the request based upon a set of predetermined rules, the predetermined rules being stored in a rules data store for use in evaluating the request and determining whether to grant or deny permission to the sender;

receiving the request comprises receiving a request including identification of a sender domain and a type of communication for the subsequent electronic communications; and the predetermined rules include rules defining the sender domain and types of communications for which the permission is grantable.

7. The method implemented by the computing device of claim 1, further comprising setting a permission expiration time and sending the permission expiration time to the sender.

8. The method implemented by the computing device of claim 1, further comprising:

intercepting the request at a recipient domain for a plurality of recipients;

analyzing the request; and granting or denying the request for the plurality of recipients.

9. A computer implemented method for permissions based communication, comprising:

receiving an electronic communication from a sender, addressed to a recipient, at a domain server, the electronic communication including a permission request for permission for the sender to send subsequent electronic communications;

analyzing the electronic communication at the domain server using a processor of the computer to determine whether to deliver the subsequent electronic communications from the sender to the recipient;

granting the permission to the sender to send the subsequent electronic communications; and setting a permission expiration time that is accessible and renewable at a permissions server at a network address by the sender.

10. The method of claim 9, wherein granting the permission comprises granting the permission by the domain server.

11. The method of claim 9, further comprising sending the permission to the sender.

12. The method of claim 9, where the permission request is signed with a sender private key of a sender asymmetric key pair.

13. The method of claim 9, wherein sending the permission to the sender includes sending the permission signed with a domain private key of a domain asymmetric key pair, the method further comprising exposing a domain public key of the domain asymmetric key pair for the sender to validate the permission.

14. A computer implemented method for permissions based communication, comprising:

sending a request from a sender to a recipient for permission for the sender to send future electronic communications, the request being signed with a sender private key of a sender asymmetric key pair;

exposing a sender public key of the sender asymmetric key pair for the recipient to validate the request;

receiving the permission from the recipient, the permission being signed with a recipient private key of a recipient asymmetric key pair;

validating the permission by a processor of the computer using an exposed recipient public key of the recipient asymmetric key pair; and accessing a set permission expiration time at a permissions server at a network address, the set permission expiration time being renewable at the network address by the sender.

15. The method of claim 14, wherein sending the request to the recipient for permission to send future electronic communications comprises requesting permission to send future electronic communications from an identified domain.

16. The method of claim 15, wherein requesting permission to send future electronic communications from the identified domain comprises requesting permission to send future electronic communications from a different domain than a domain from which the request is sent.

17. The method of claim 14, wherein sending the request to the recipient comprises sending the request to the recipient via a third-party mailing service.

18. The method of claim 17, further comprising providing the permission to the third-party mailing service as authorization to send the future electronic communications to the recipient.

19. The method of claim 14, further comprising verifying an expiration status of the permission and sending at least one of the future electronic communications when the permission has a valid status.

20. The method of claim 19, wherein the permission or the exposed recipient public key of the recipient asymmetric key pair references a network address at which the expiration status is established, the method further comprising accessing the network address to verify the expiration status.

21. The method of claim 20, further comprising renewing the permission at the network address when the permission has an expired status.

22. The method of claim 14, further comprising storing the permission signed with the recipient private key as a permission confirmation.

23. A non-transitory computer-readable medium storing computer-executable instructions that, when executed by a processor, cause the processor to operate as permissions based communication system, comprising:
 a sender identification module to identify a sender requesting to send electronic communications to a recipient;
 a key generation module to generate a sender asymmetric key pair for the sender;
 a request module to send a request to the recipient for permission for the sender to send the electronic communications to the recipient as from the sender, the request being signed with part of the sender asymmetric key pair, the request module being further configured to query a set permission expiration time at a permissions server at a network address when the permission is granted, the set permission expiration time being renewable by the sender; and
 a response module to receive a response from the recipient.

24. The non-transitory computer-readable medium of claim 23, wherein the permissions based communication system further comprises a verification module to verify permissions from recipients when the sender provides a list of recipients with a request to send the electronic communications to the list of recipients.

25. The method implemented by the computing device of claim 1, wherein the sender is a marketer and the subsequent electronic communications are marketing communications.

26. The method implemented by the computing device of claim 1, wherein validating the sender private key comprises communicating with a verification server at which the sender public key is exposed; and wherein exposing a recipient public key comprises instructing the verification server to expose the recipient public key to the sender.

* * * * *